(12) United States Patent
Yamada

(10) Patent No.: US 8,908,303 B1
(45) Date of Patent: Dec. 9, 2014

(54) METHOD FOR SERVO DEMODULATION AND DISK STORAGE APPARATUS

(71) Applicant: Kabushiki Kaisha Toshiba, Tokyo (JP)

(72) Inventor: Tomoyoshi Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/081,908

(22) Filed: Nov. 15, 2013

Related U.S. Application Data

(60) Provisional application No. 61/859,878, filed on Jul. 30, 2013.

(51) Int. Cl.
| | |
|---|---|
| *G11B 5/02* | (2006.01) |
| *G11B 20/06* | (2006.01) |
| *G11B 20/08* | (2006.01) |
| *G11B 5/596* | (2006.01) |

(52) U.S. Cl.
CPC ................................. *G11B 5/59688* (2013.01)
USPC .......................................... 360/29; 360/77.08

(58) Field of Classification Search
None
See application file for complete search history.

(56) References Cited

U.S. PATENT DOCUMENTS

| | | | |
|---|---|---|---|
| 4,549,232 A | 10/1985 | Axmear et al. | |
| 5,689,384 A | 11/1997 | Albrecht et al. | |
| 6,046,879 A | 4/2000 | Hampshire | |
| 6,067,204 A | 5/2000 | Tremaine | |
| 6,078,460 A | 6/2000 | Moriya | |
| 6,590,729 B1 | 7/2003 | Akagi et al. | |
| 6,853,514 B2 | 2/2005 | Li et al. | |
| 6,922,304 B2 | 7/2005 | Nakagawa | |
| 7,209,314 B2 | 4/2007 | Bandic et al. | |
| 7,312,946 B2 | 12/2007 | Asakura et al. | |
| 7,430,082 B2 | 9/2008 | Heydari et al. | |
| 7,440,224 B2 | 10/2008 | Ehrlich et al. | |
| 7,457,066 B2 | 11/2008 | Ehrlich et al. | |
| 7,529,059 B2 | 5/2009 | Ryu et al. | |
| 7,859,778 B1 | 12/2010 | Vikramaditya et al. | |
| 7,859,787 B2 | 12/2010 | Kisaka | |
| 8,023,219 B2 | 9/2011 | Kosugi | |

(Continued)

FOREIGN PATENT DOCUMENTS

| | | |
|---|---|---|
| JP | 07-065306 | 3/1995 |
| JP | 08-249842 A | 9/1996 |

(Continued)

OTHER PUBLICATIONS

U.S. Appl. No. 61/822,565, filed May 13, 2013, Yamada.

(Continued)

*Primary Examiner* — Daniell L Negron
(74) *Attorney, Agent, or Firm* — Knobbe Martens Olson & Bear LLP

(57) ABSTRACT

According to one embodiment, in a method for servo demodulation, a first demodulated signal and a second demodulated signal, which are calculated from amplitude values of burst signal patterns of a first area and a second area, are generated in order to generate a position error signal of a reader, based on a servo pattern read from a disk by the reader. Further, in the method for servo demodulation, a square-root of sum of squares of the first and the second demodulated signals is calculated, and an optimal compensation coefficient of a linearity correction function to be used in linearity compensation of the position error signal is calculated based on a maximum value and a minimum value of the square-root of sum of squares.

18 Claims, 34 Drawing Sheets

(56) References Cited

U.S. PATENT DOCUMENTS

| | | | |
|---|---|---|---|
| 8,077,428 B1 * | 12/2011 | Chen et al. ............... 360/75 |
| 8,295,002 B1 | 10/2012 | Katchmart | |
| 8,625,230 B2 | 1/2014 | Kosugi et al. | |
| 2004/0080863 A1 | 4/2004 | Nakagawa | |
| 2009/0040641 A1 | 2/2009 | Ehrlich et al. | |
| 2011/0063751 A1 | 3/2011 | Yasuna et al. | |
| 2012/0293885 A1 | 11/2012 | Kosugi et al. | |
| 2014/0078614 A1 | 3/2014 | Sudo | |

FOREIGN PATENT DOCUMENTS

| | | |
|---|---|---|
| JP | 2000-514585 | 10/2000 |
| JP | 2001-110027 | 4/2001 |
| JP | 2004-145968 A | 5/2004 |
| JP | 2006-309843 | 11/2006 |
| JP | 2009-110597 | 5/2009 |
| JP | 2010-049742 A | 3/2010 |
| JP | 4649421 | 12/2010 |
| JP | 2012205594 | 10/2012 |
| JP | 2012-243367 | 12/2012 |
| JP | 2014-059932 | 4/2014 |
| WO | WO 2008/139603 | 11/2008 |

OTHER PUBLICATIONS

U.S. Appl. No. 13/578,781, filed Feb. 4, 2013, K.K. Toshiba.
U.S. Appl. No. 14/018,212, filed Sep. 4, 2013, K.K. Toshiba.
U.S. Appl. No. 14/194,482, filed Feb. 28, 2014, Kabushiki Kaisha Toshiba.

* cited by examiner

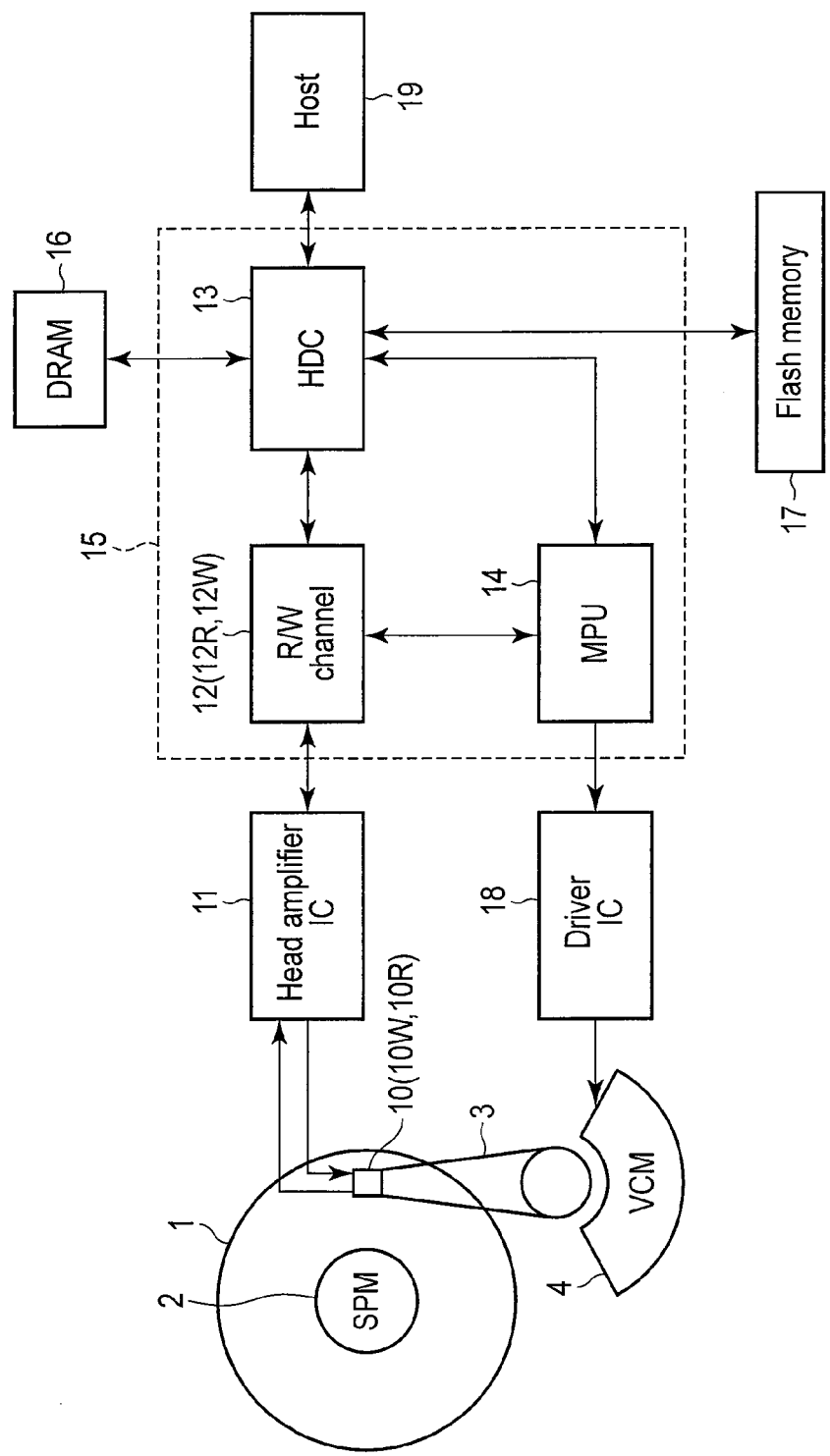
F I G. 1

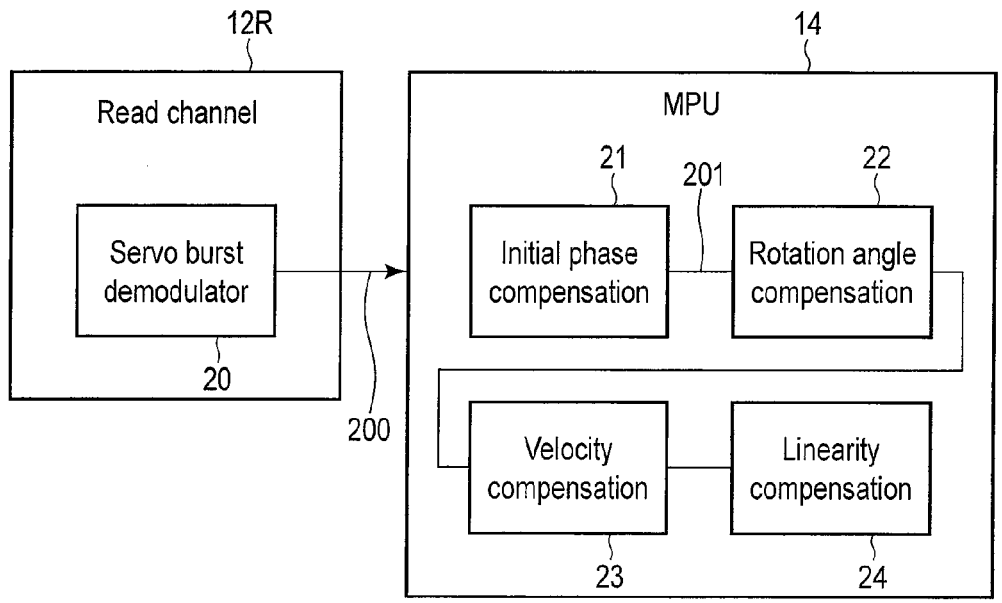
F I G. 2
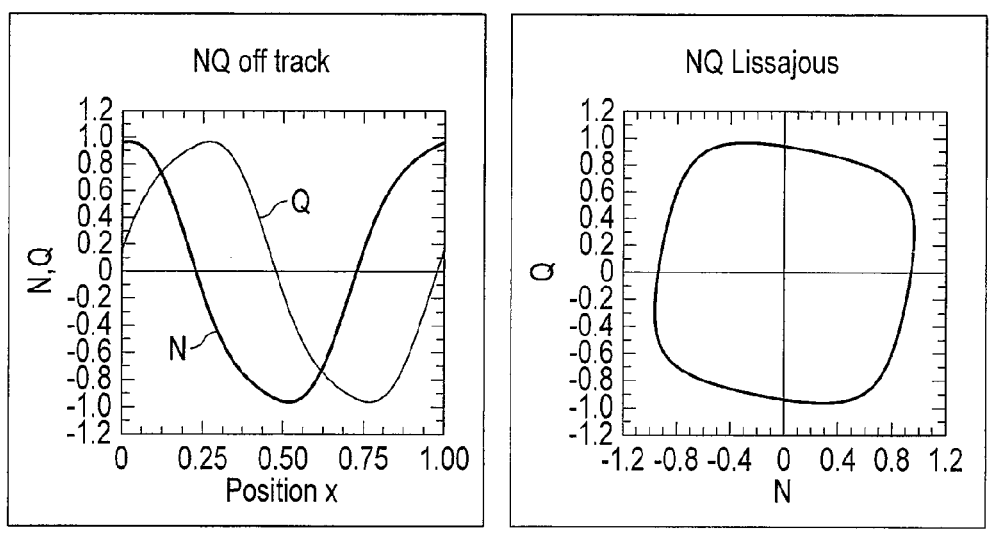
F I G. 3A        F I G. 3B

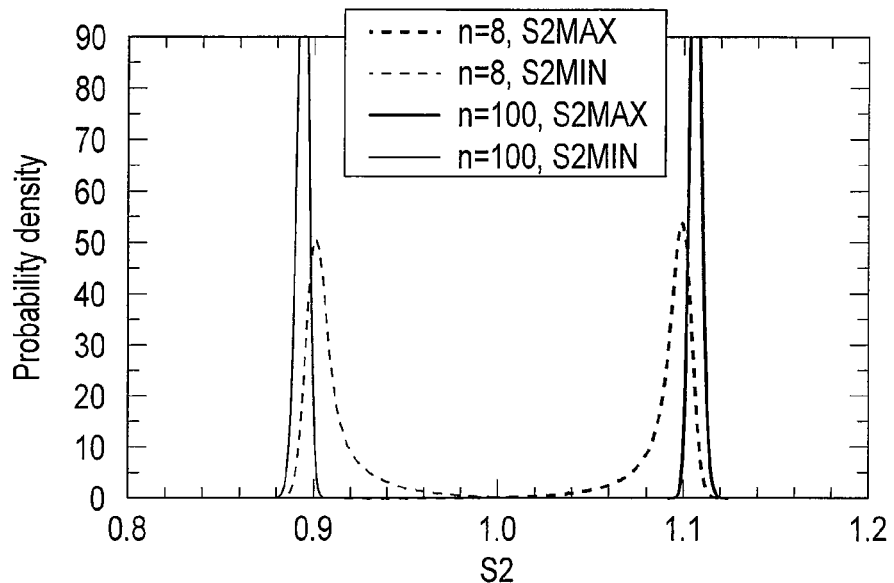
F I G. 4A
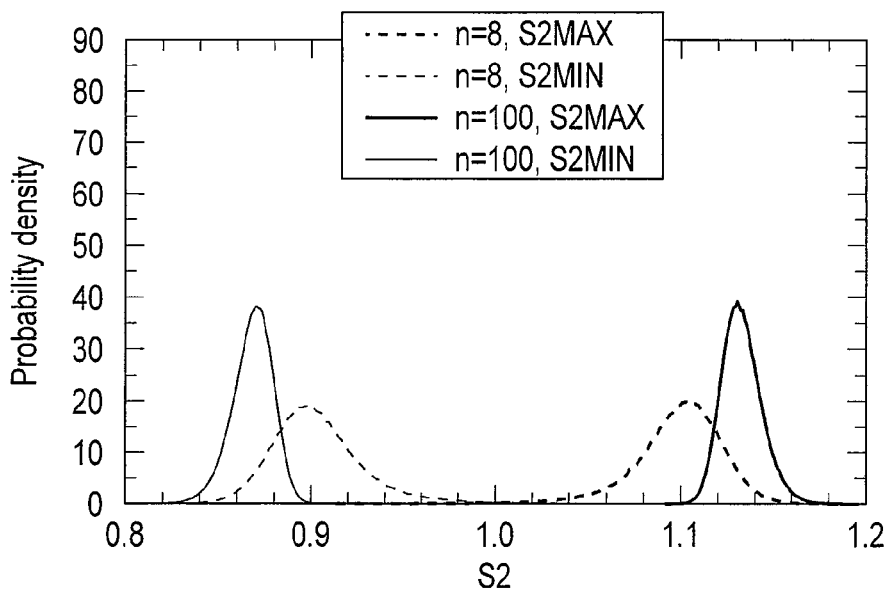
F I G. 4B

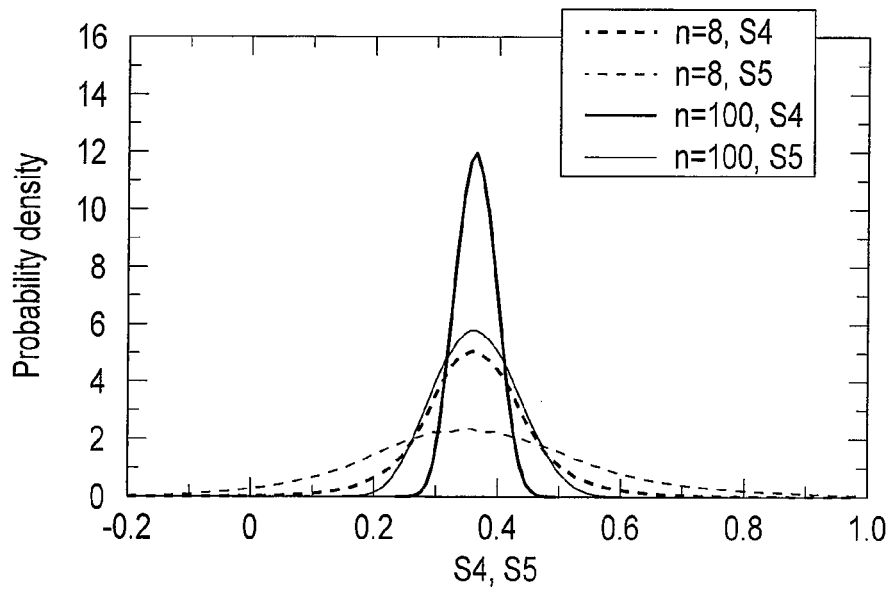
F I G. 5A
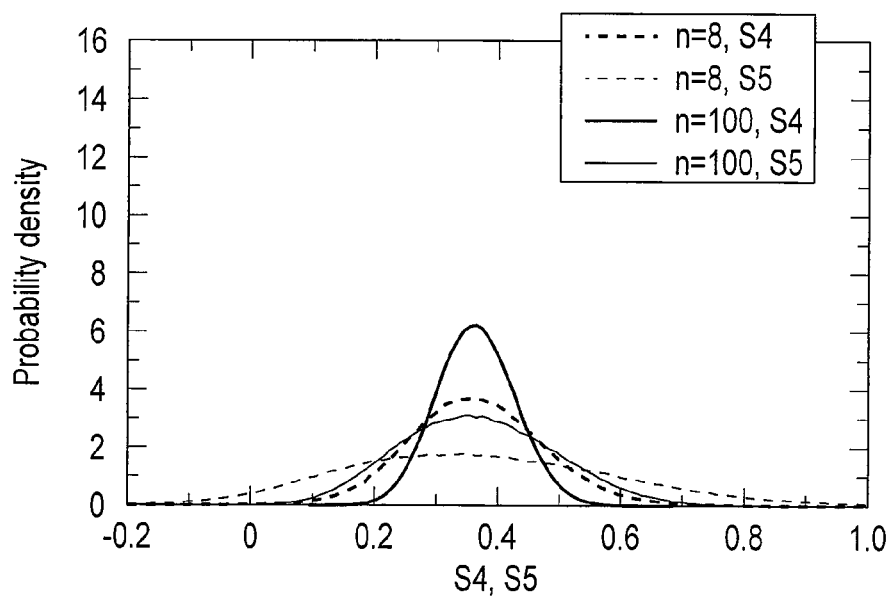
F I G. 5B

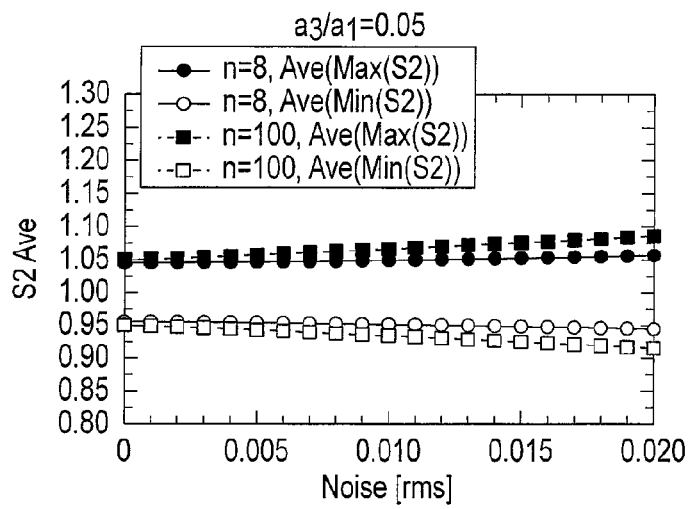
F I G. 6A
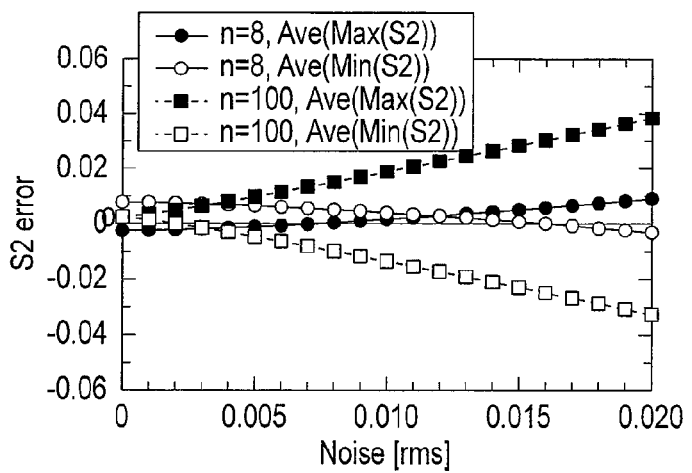
F I G. 6B
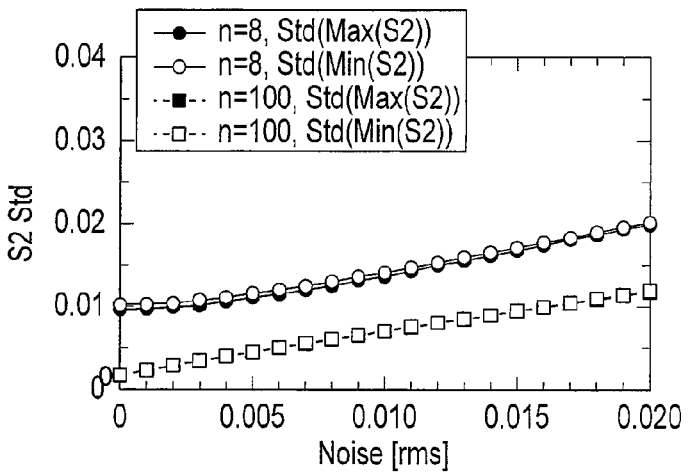
F I G. 6C

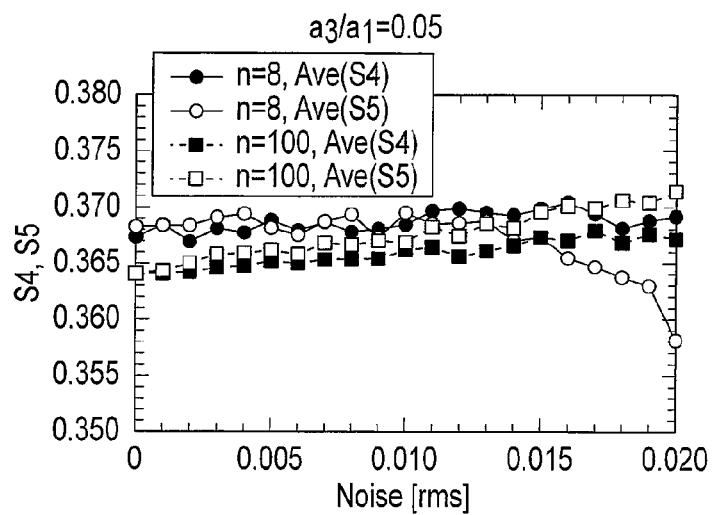
F I G. 8A
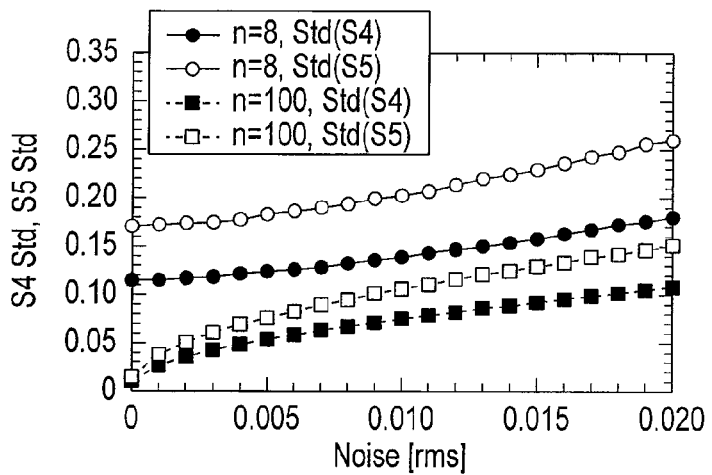
F I G. 8B
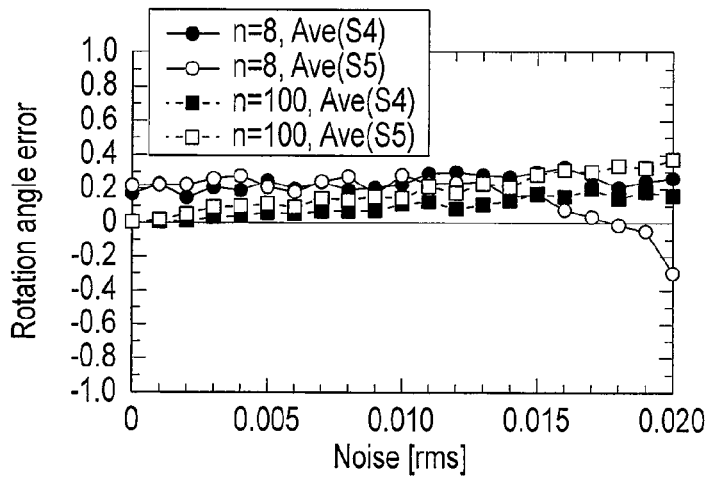
F I G. 8C

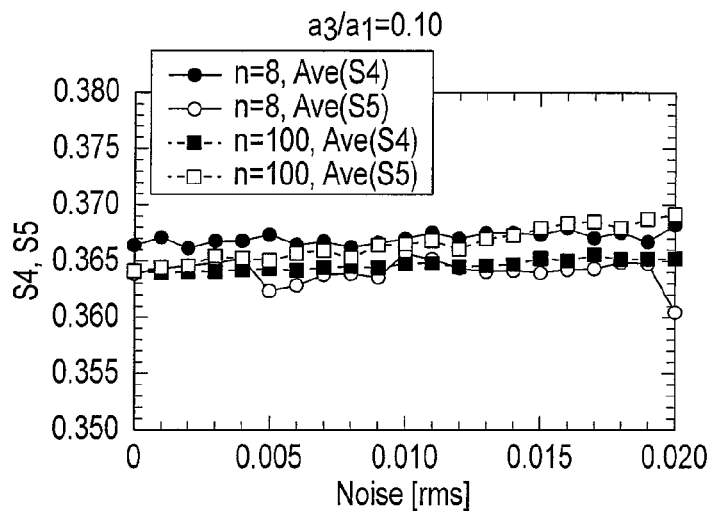
F I G. 8D
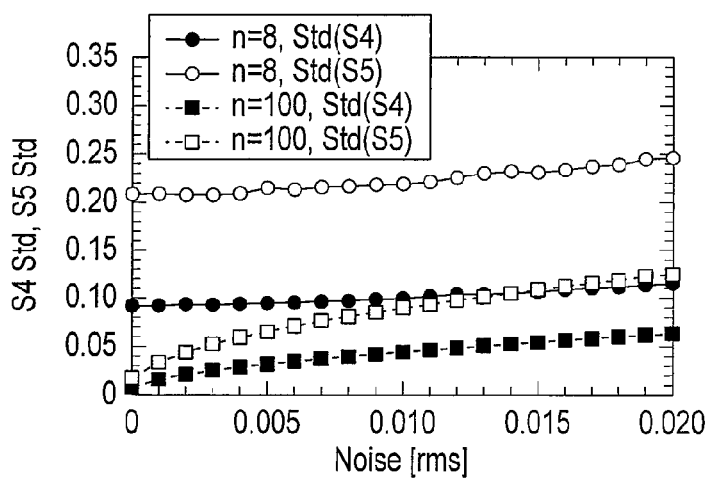
F I G. 8E
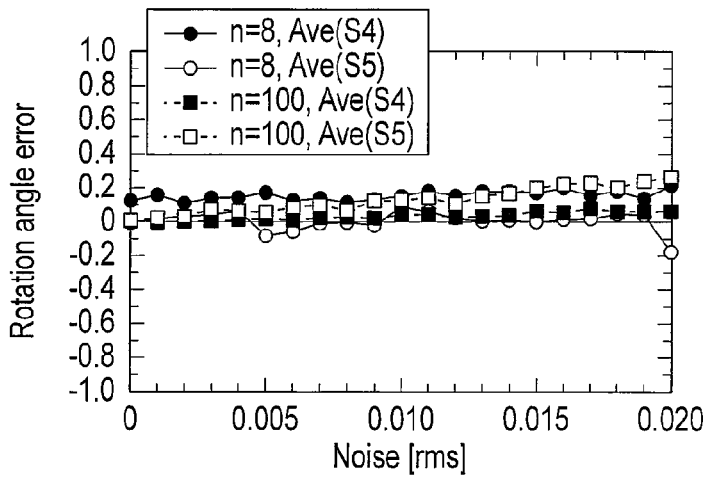
F I G. 8F

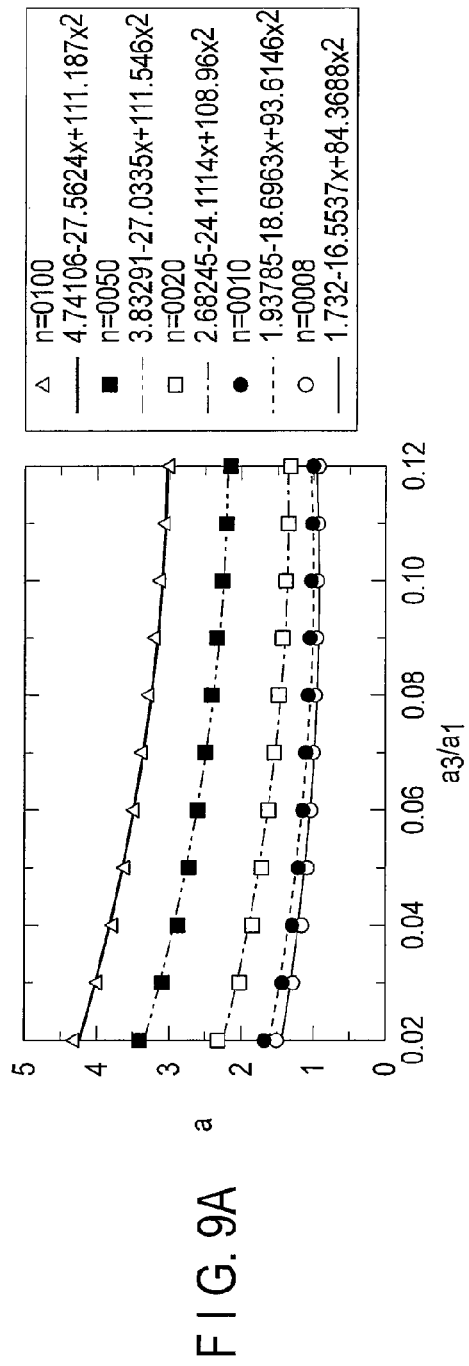
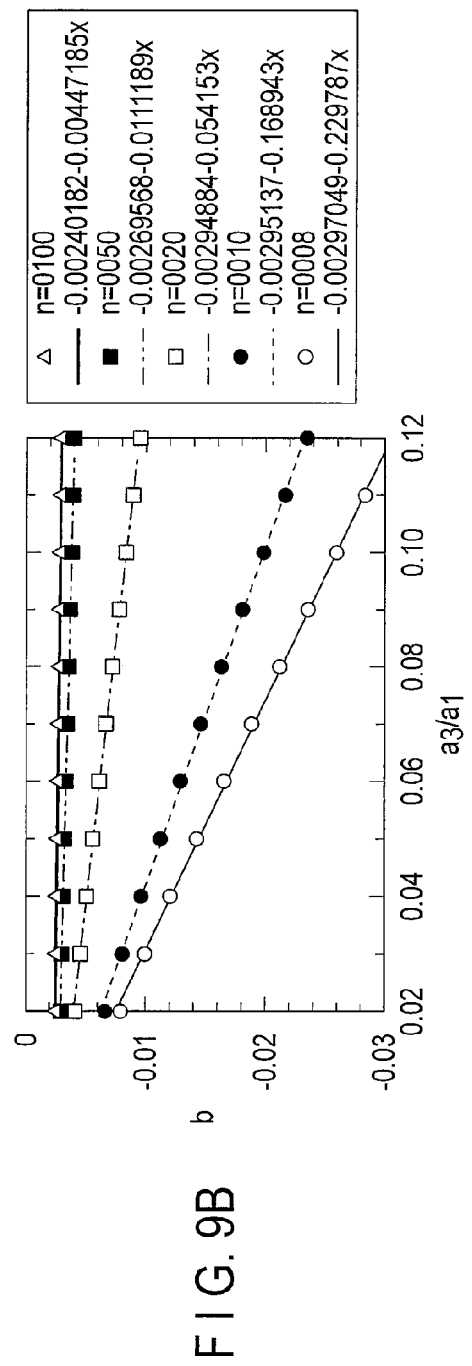
FIG. 9A
FIG. 9B

| n | Coefficients of quadratic approximate expression of a | | | Coefficients of linear approximate expression of b | |
|---|---|---|---|---|---|
| | $a_0$ | $a_1$ | $a_2$ | $b_0$ | $b_1$ |
| 4 | 1.220 | -8.881 | 53.916 | -0.000975 | -0.588693 |
| 5 | 1.375 | -11.654 | 62.478 | -0.002597 | -0.426947 |
| 6 | 1.506 | -13.648 | 71.631 | -0.002845 | -0.338498 |
| 8 | 1.732 | -16.554 | 84.369 | -0.002970 | -0.229787 |
| 10 | 1.938 | -18.696 | 93.615 | -0.002951 | -0.168943 |
| 12 | 2.120 | -20.370 | 98.566 | -0.003030 | -0.125734 |
| 15 | 2.356 | -22.222 | 104.755 | -0.002988 | -0.088488 |
| 16 | 2.427 | -22.762 | 106.039 | -0.002994 | -0.078530 |
| 20 | 2.682 | -24.111 | 108.960 | -0.002949 | -0.054153 |
| 24 | 2.907 | -24.941 | 110.459 | -0.002938 | -0.040302 |
| 25 | 2.958 | -25.205 | 110.679 | -0.002934 | -0.036883 |
| 30 | 3.186 | -26.008 | 112.340 | -0.002879 | -0.026893 |
| 50 | 3.833 | -27.034 | 111.546 | -0.002696 | -0.011119 |
| 75 | 4.367 | -27.580 | 112.016 | -0.002535 | -0.005900 |
| 100 | 4.741 | -27.562 | 111.187 | -0.002402 | -0.004472 |
| 150 | 5.304 | -28.074 | 112.713 | -0.002300 | -0.002489 |
| 200 | 5.700 | -28.063 | 112.011 | -0.002224 | -0.001945 |

F I G. 10

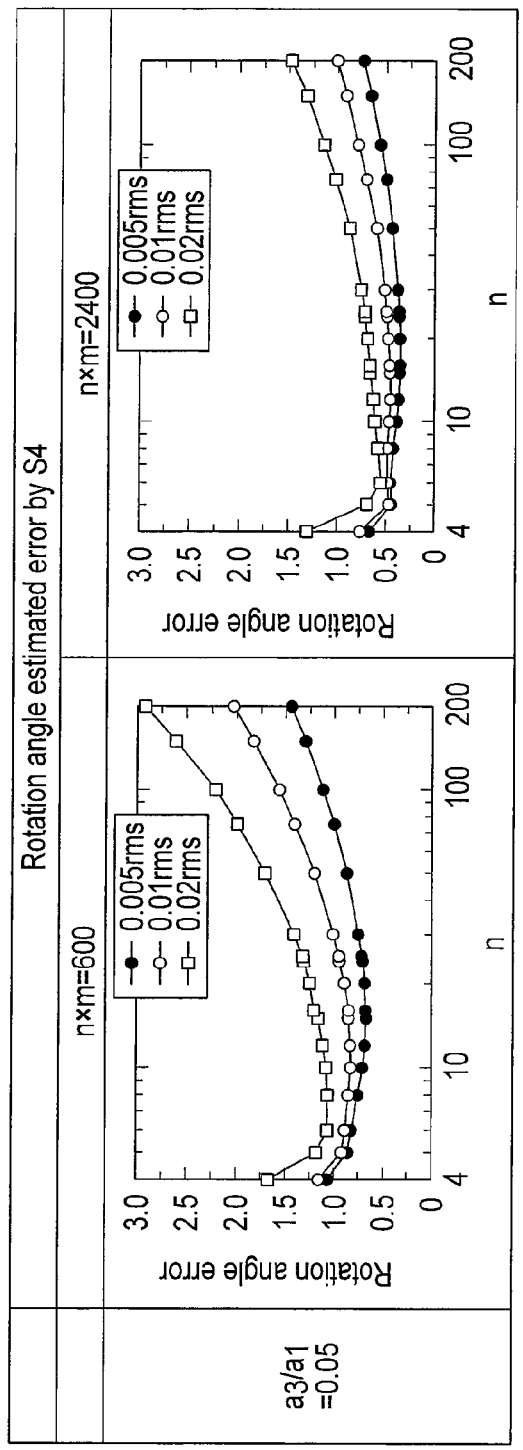
F I G. 12A
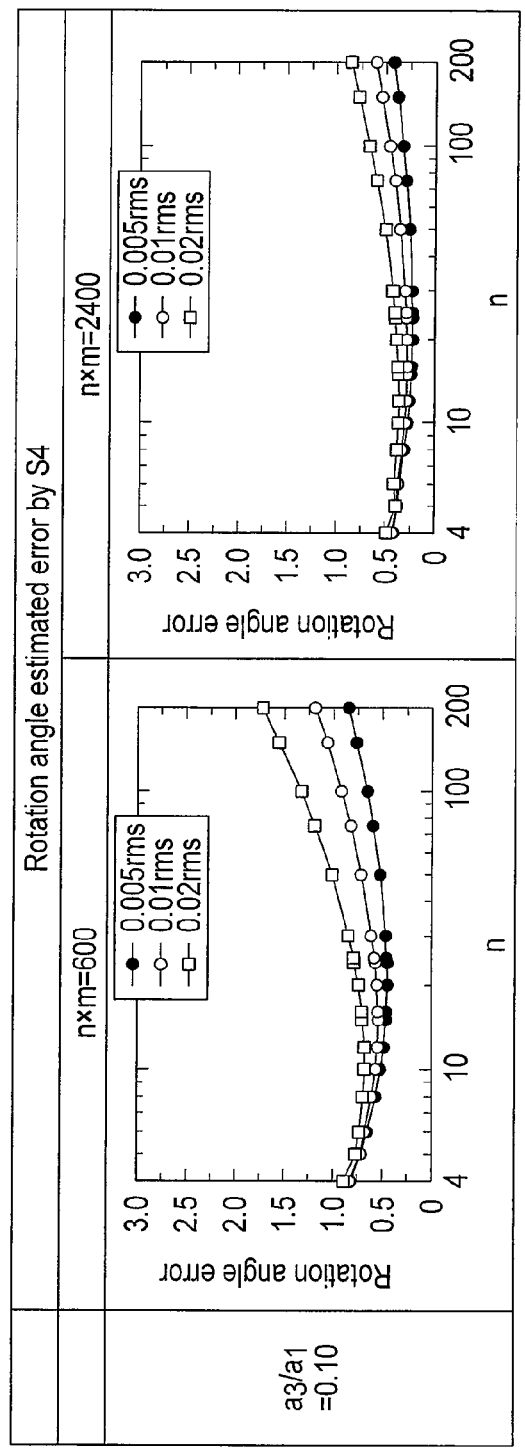
F I G. 12B

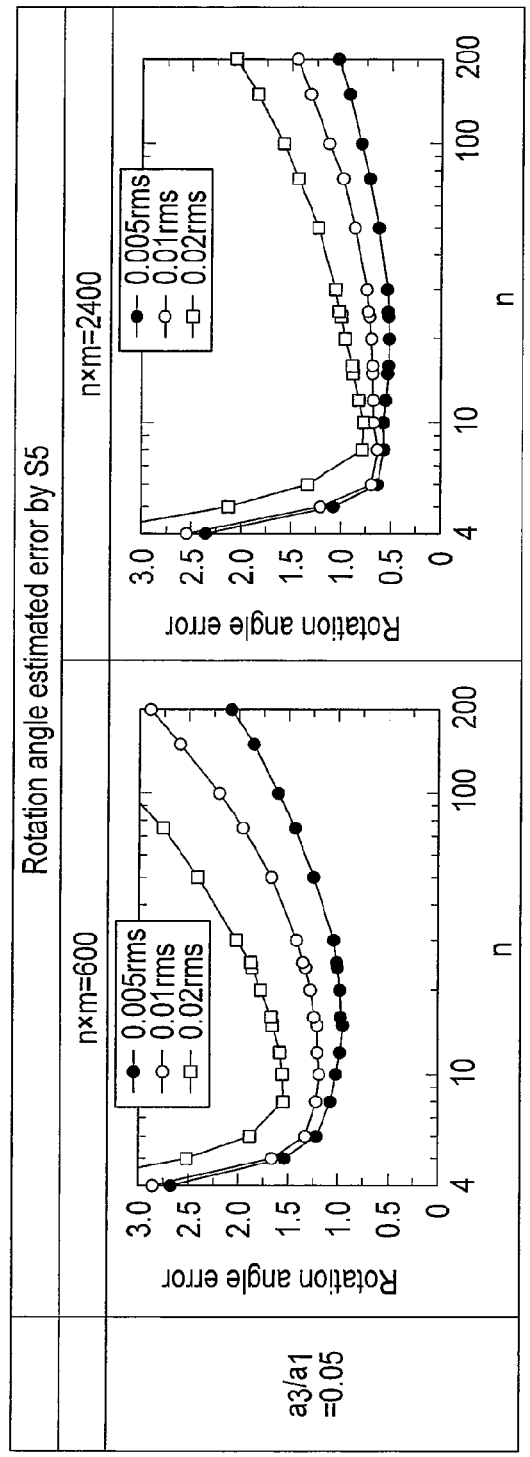
F I G. 13A
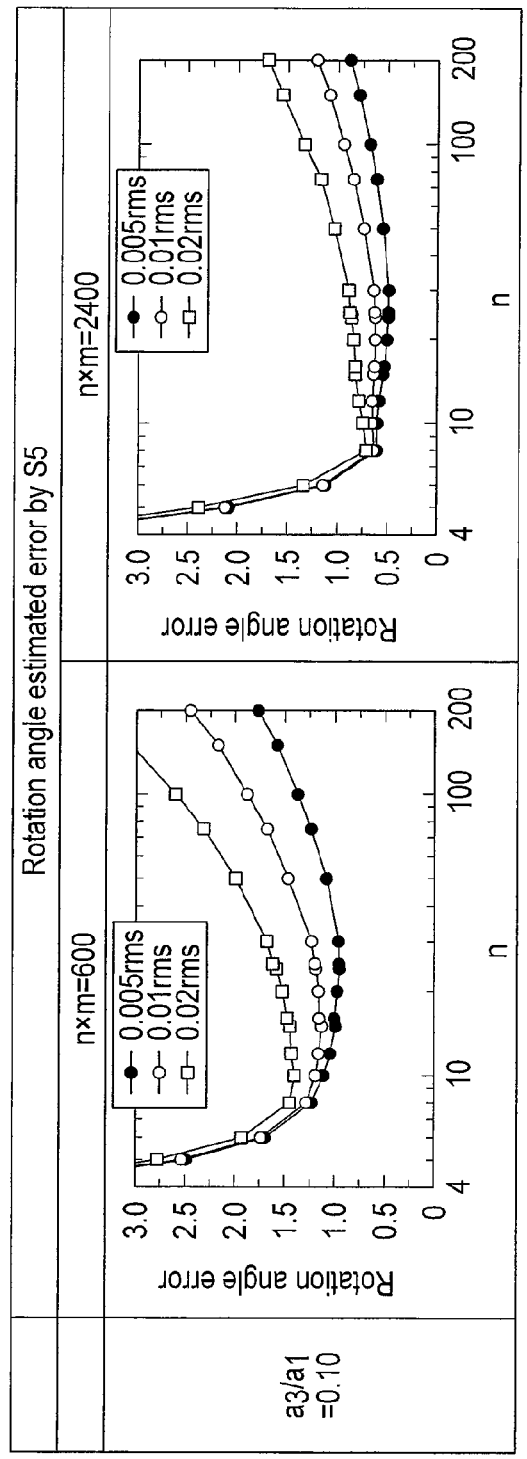
F I G. 13B

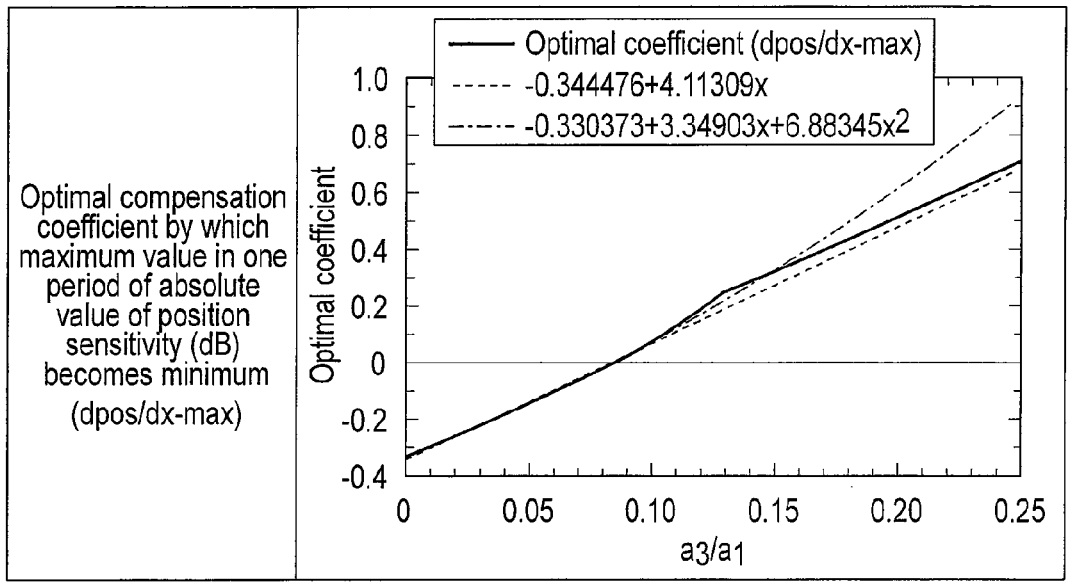
F I G. 14C
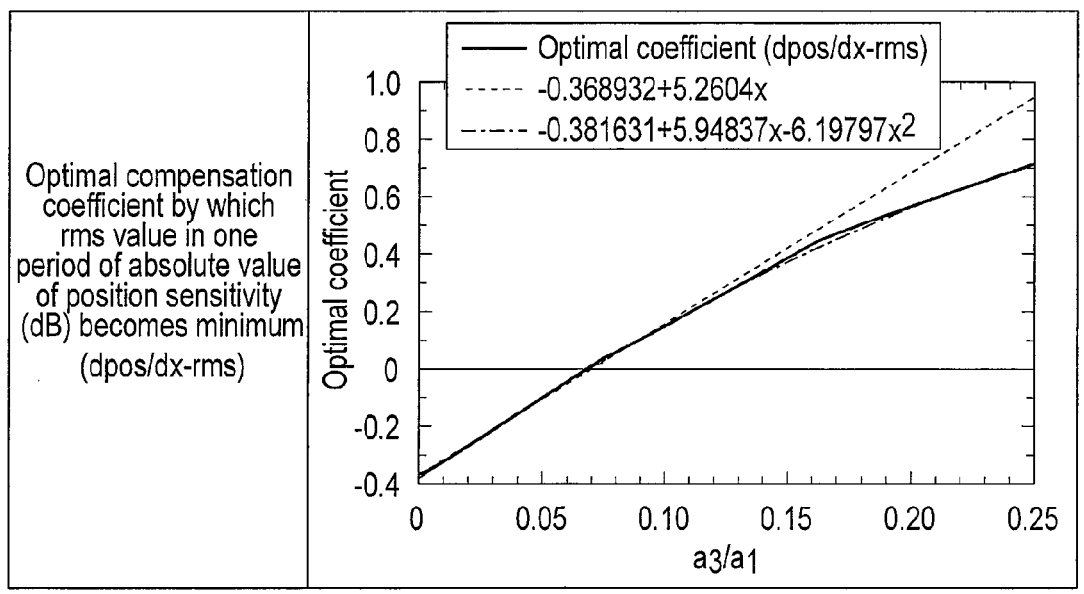
F I G. 14D

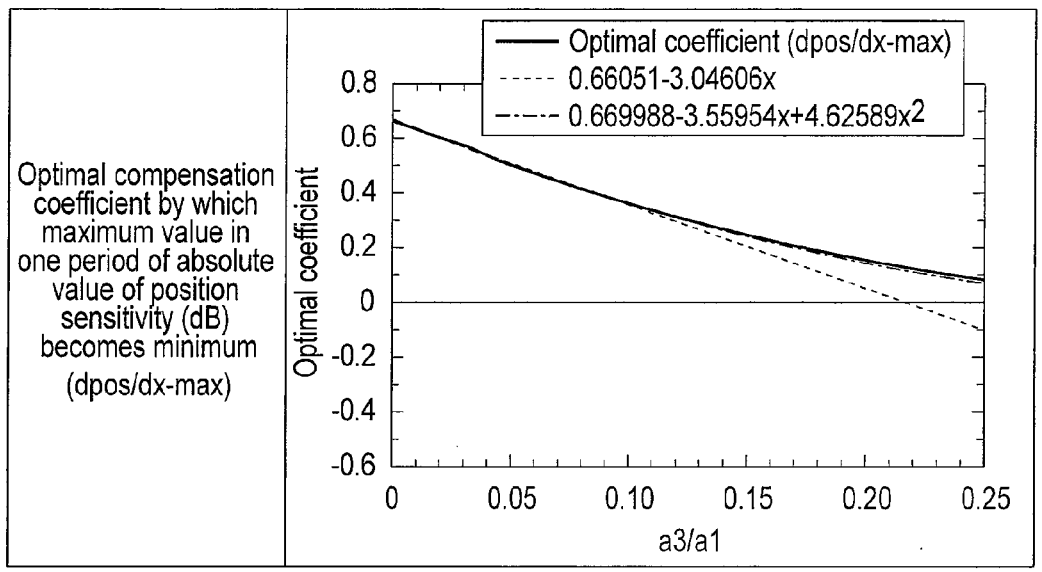
F I G. 15C
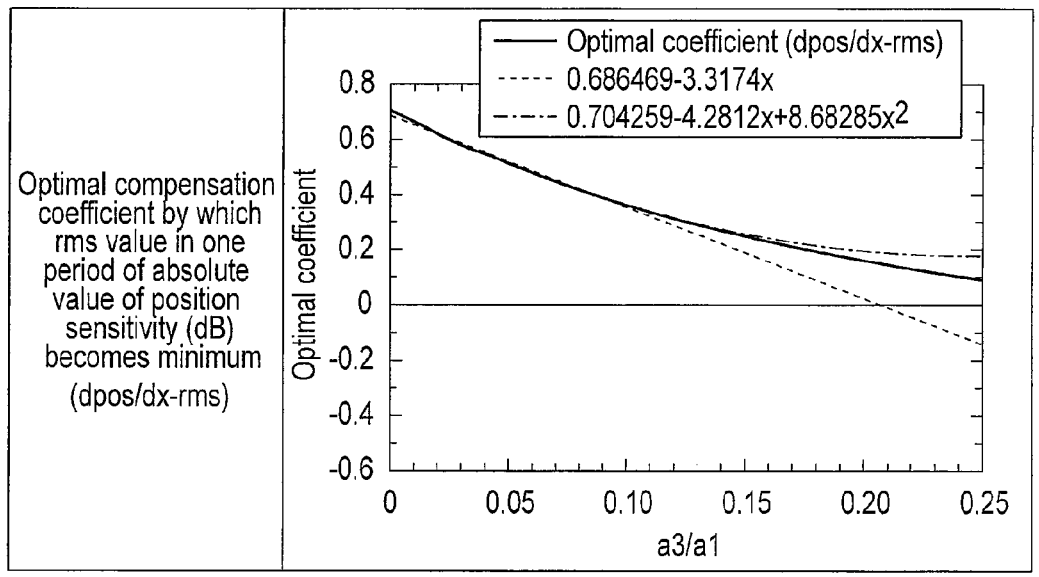
F I G. 15D

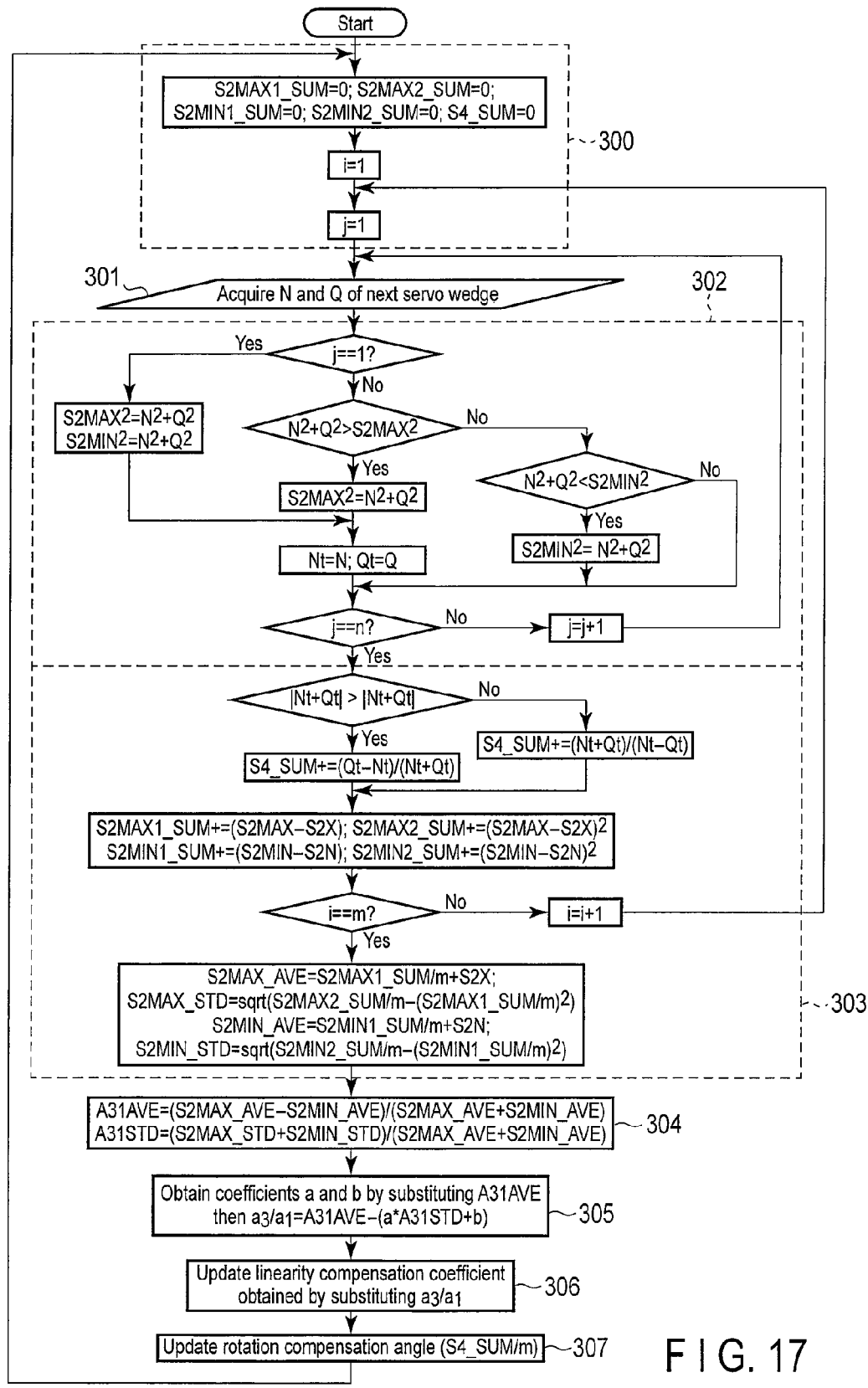
F I G. 17

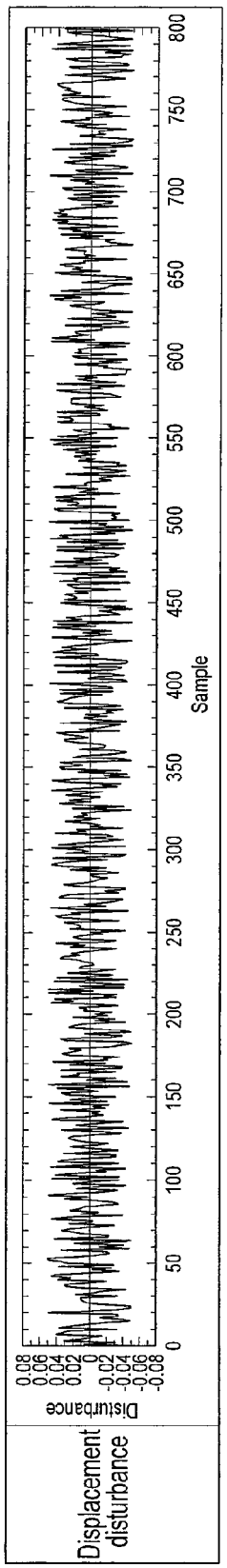
F I G. 18A
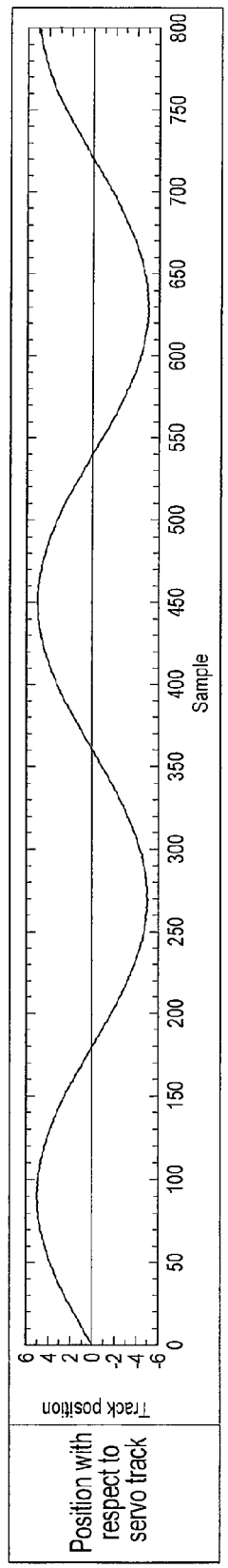
F I G. 18B
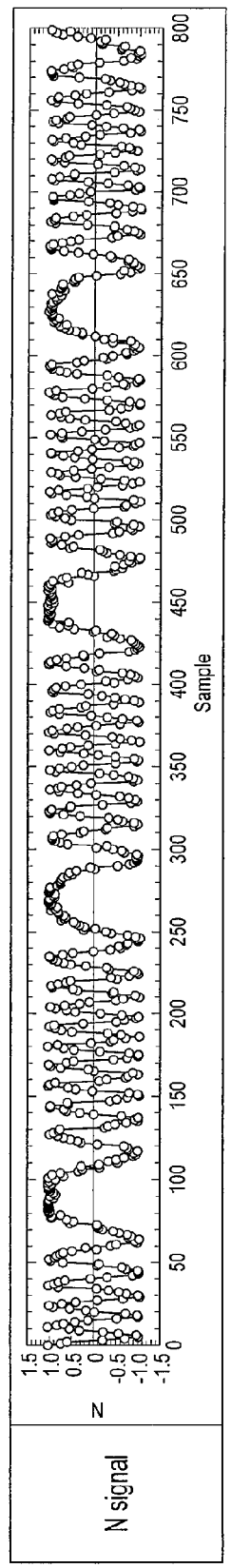
F I G. 18C

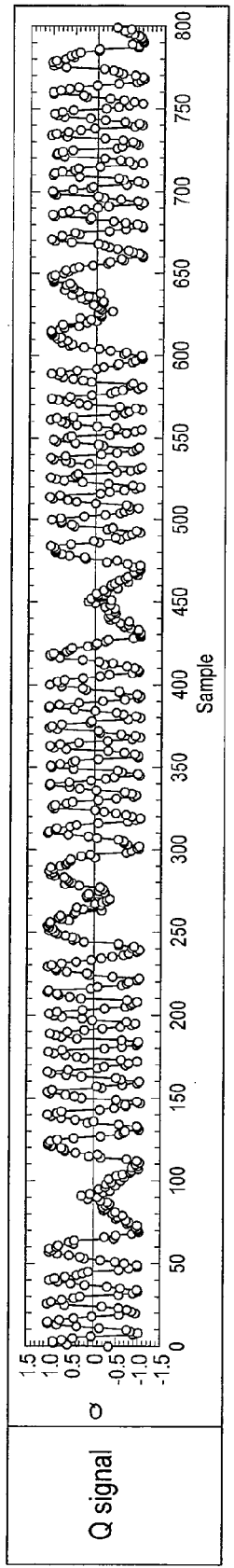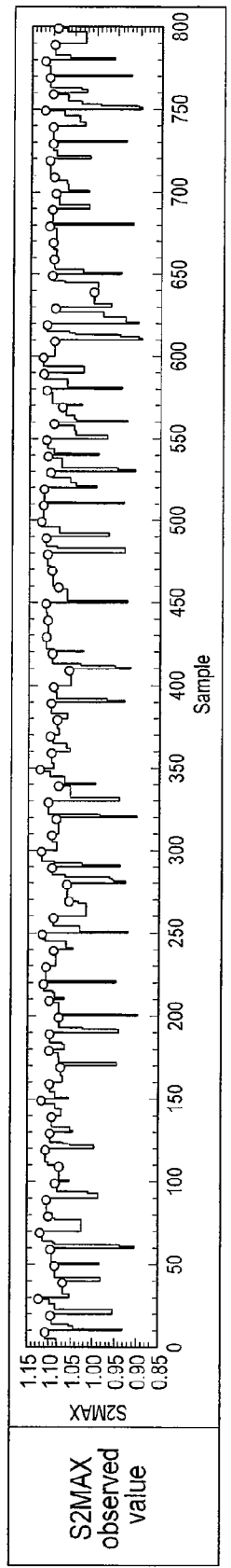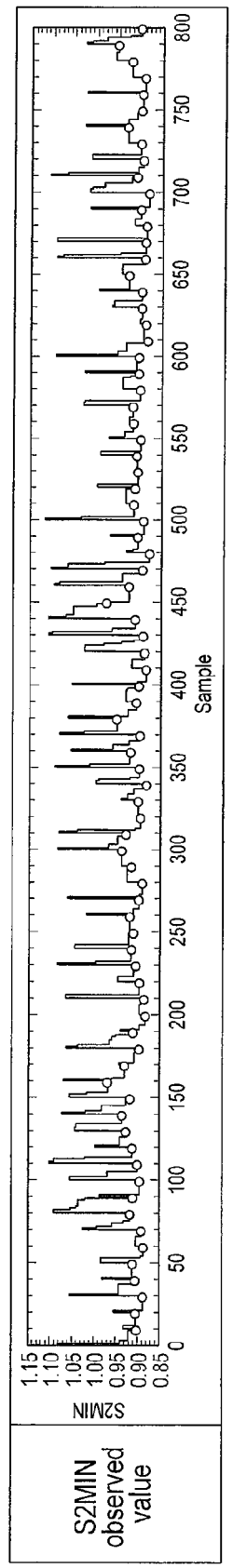

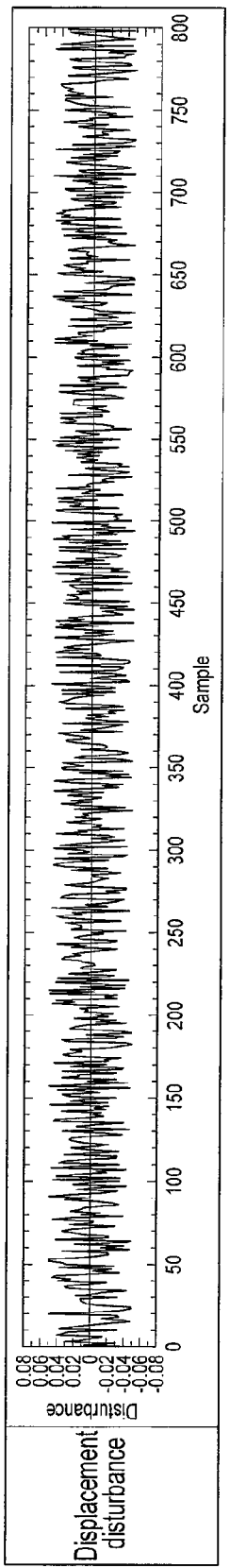
F I G. 19A
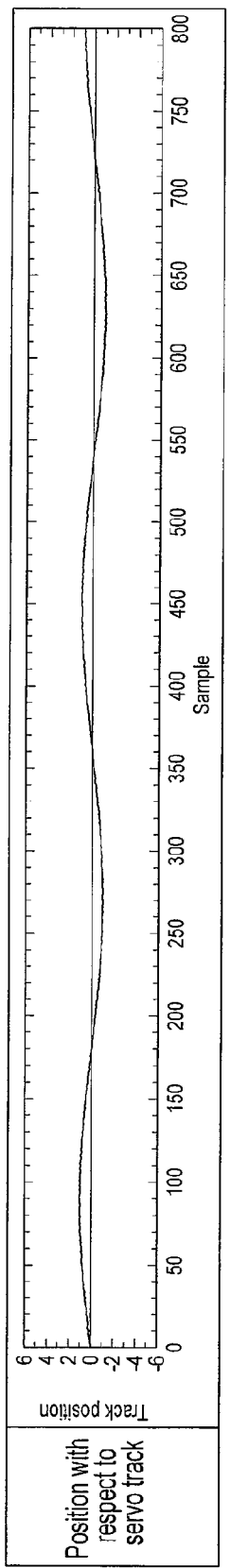
F I G. 19B
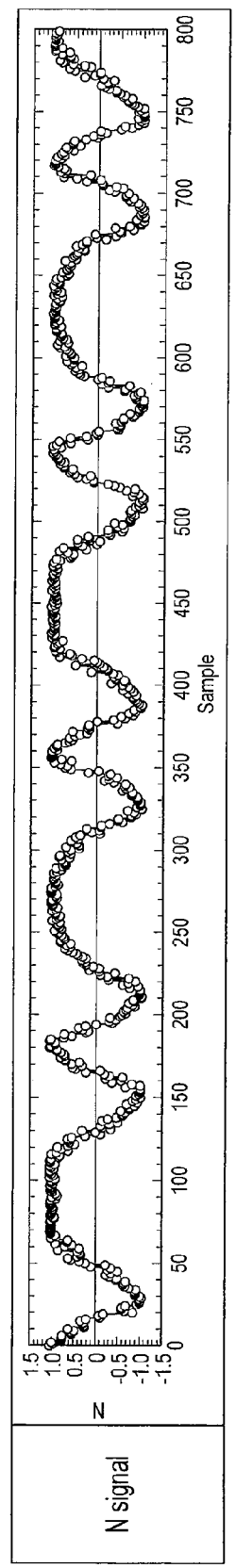
F I G. 19C

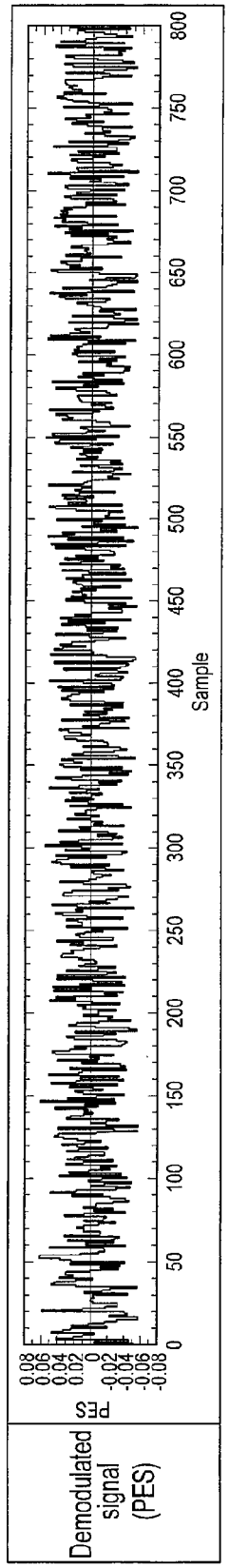
F I G. 19J
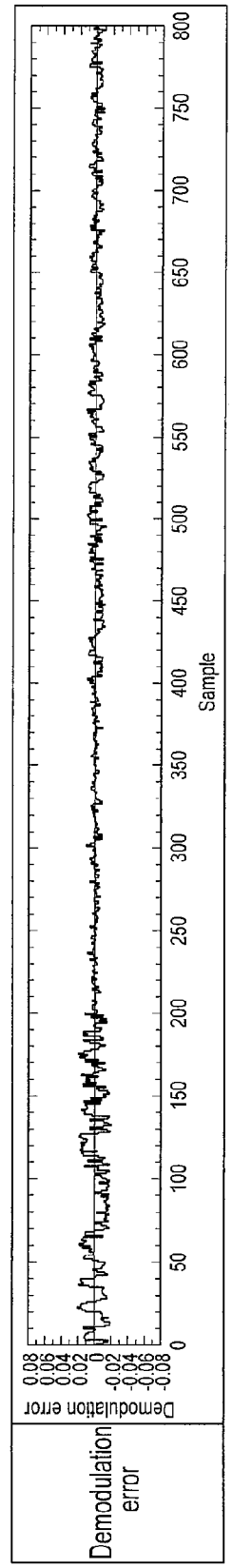
F I G. 19K

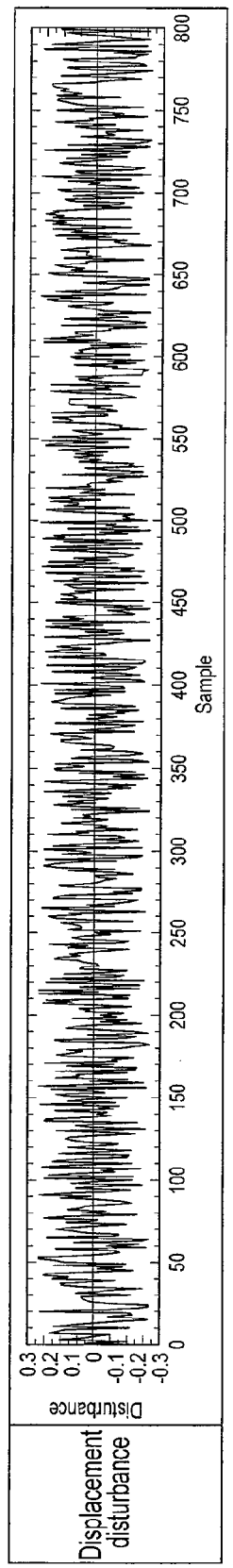
F I G. 20A
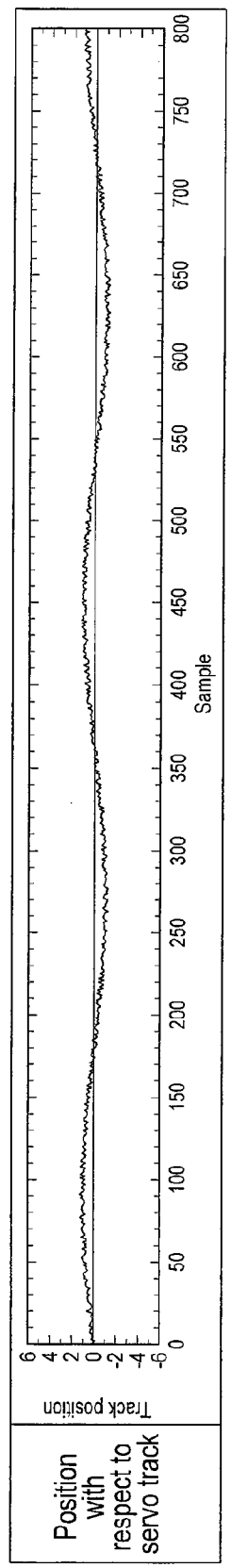
F I G. 20B
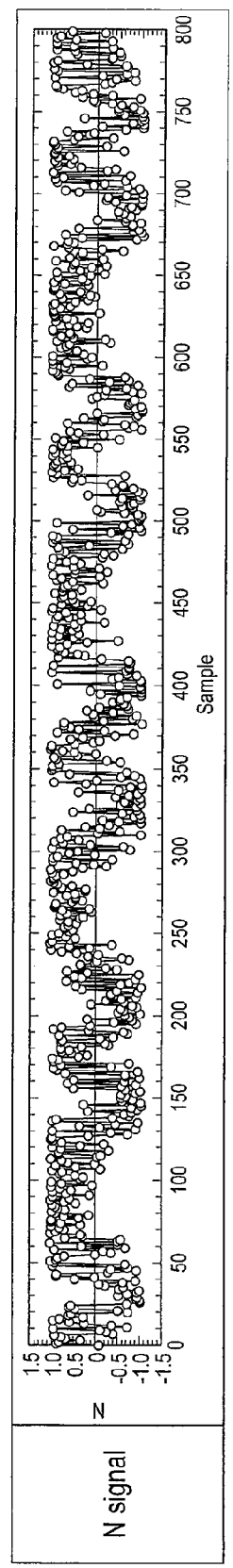
F I G. 20C

METHOD FOR SERVO DEMODULATION AND DISK STORAGE APPARATUS

CROSS-REFERENCE TO RELATED APPLICATIONS

This application claims the benefit of U.S. Provisional Application No. 61/859,878, filed Jul. 30, 2013, the entire contents of which are incorporated herein by reference.

FIELD

Embodiments described herein relate generally to a method for servo demodulation and a disk storage apparatus.

BACKGROUND

A magnetic disk storage apparatus (which may be simply referred to as a "disk drive") whose representative example is a hard disk drive (HDD) comprises a servo system for positioning a head at a target position on a disk. The servo system demodulates (calculates) a position signal (position information) indicating a position of the head on the disk based on a servo pattern (servo data) recorded in a servo area (servo wedge) on the disk.

The position signal includes a track address (Gray codes) for identifying a servo track number on the disk and a position error signal (PES) indicating a relative position of the head with respect to the servo track. Servo demodulation is hereinafter intended as demodulation of the position error signal (PES).

As the servo pattern, there are mainly a null servo pattern and an area servo pattern. The null servo pattern is comprised of two burst patterns, i.e. burst signal patterns having different magnetization patterns. Accordingly, a disk drive which uses the null servo pattern can reduce a servo area as compared to the case of using the area servo pattern, and thus, a disk drive with the null servo pattern has the advantage of being able to secure more data areas.

The servo system demodulates the null servo pattern from a read signal read by a reader (or read head). Further, the servo system is configured to correct the demodulated signal and to execute servo signal demodulation for demodulating the position error signal (PES) indicating the position of the head (reader). In the servo signal demodulation, in order to demodulate the position error signal which correctly indicates the position of the reader, linearity compensation, which corrects an error of the demodulated position with respect to the actual position, is especially important. In the linearity compensation, it is important to obtain an optimal compensation coefficient (or optimal compensation parameter) of the correction function.

In the past, correction functions using compensation coefficients were proposed, and methods for determining optimal compensation coefficients for those correction functions were also proposed. However, optimal compensation coefficients depend on a magnetization pattern distribution on a disk and a head sensitivity distribution of a read head. The head sensitivity distribution varies depending on an azimuth, a flying height, or pole tip protrusion (PTP). Especially, it has been confirmed that the head sensitivity distribution varies depending on the PTP, and by this change, a servo demodulation error increases significantly. Therefore, after shipment of a disk drive, it is preferred that a servo system monitors an optimal compensation coefficient and updates the optimal compensation coefficient in a relatively short time depending on the change in the PTP, etc. By such an update, realizing servo signal demodulation for demodulating a correct position error signal is enabled.

BRIEF DESCRIPTION OF THE DRAWINGS

FIG. 1 is a block diagram for explaining a structure of a disk drive according to an embodiment;

FIG. 2 is a block diagram for explaining a configuration of a servo system according to the embodiment;

FIGS. 3A and 3B are figures for explaining a relationship between PTP and Lissajous according to the embodiment;

FIGS. 4A and 4B are figures showing probability density of S2MAX and S2MIN as specific examples of the embodiment;

FIGS. 5A and 5B are figures showing probability density of S4 and S5 as specific examples of the embodiment;

FIGS. 6A, 6B, 6C, 6D, 6E and 6F are figures showing changes in observed values of S2MAX and S2MIN with respect to noise as specific examples of the embodiment;

FIGS. 8A, 8B, 8C, 8D, 8E and 8F are figures showing changes in observed values of S4 and S5 with respect to noise as specific examples of the embodiment;

FIGS. 9A and 9B are figures for explaining a compensation coefficient with respect to an amplitude ratio as specific examples of the embodiment;

FIG. 10 is a figure showing an example of an approximate expression of FIGS. 9A and 9B;

FIGS. 12A and 12B are figures for explaining a rotation angle estimated error with respect to the number of samples as specific examples of the embodiment;

FIGS. 13A and 13B are figures for explaining a rotation angle estimated error with respect to the number of samples as specific examples of the embodiment;

FIGS. 14A, 14B, 14C and 14D are figures for explaining an optimal compensation coefficient with respect to the amplitude ratio as specific examples of the embodiment;

FIGS. 15A, 15B, 15C and 15D are figures for explaining an optimal compensation coefficient with respect to the amplitude ratio as specific examples of the embodiment;

FIG. 17 is a flowchart for explaining a procedure of servo demodulation processing according to the embodiment;

FIGS. 18A, 18B, 18C, 18D, 18E, 18F, 18G, 18H, 18I, 18J and 18K are figures for explaining a specific example of update processing for the optimal compensation coefficient and the rotation compensation angle in the servo demodulation processing of the embodiment;

FIGS. 19A, 19B, 19C, 19D, 19E, 19F, 19G, 19H, 19I, 19J and 19K are figures for explaining a specific example of the update processing for the optimal compensation coefficient and the rotation compensation angle in the servo demodulation processing of the embodiment; and FIGS. 20A, 20B, 20C, 20D, 20E, 20F, 20G, 20H, 20I, 20J and 20K are figures for explaining a specific example of the update processing for the optimal compensation coefficient and the rotation compensation angle in the servo demodulation processing of the embodiment.

DETAILED DESCRIPTION

Figure 6D:
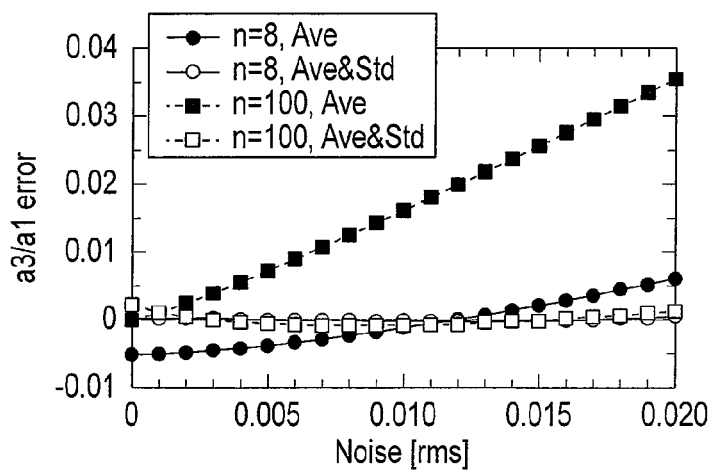

Various embodiments will be described hereinafter with reference to the accompanying drawings.

In general, according to one embodiment, a method for servo demodulation comprises generating a first demodulated signal and a second demodulated signal calculated from amplitude values of burst signal patterns in a first area and a second area, in order to generate a position error signal of a reader based on a servo pattern read from a disk by the reader. Further, the method for servo demodulation comprises calculating a square-root of sum of squares of the first and second demodulated signals, and calculating an optimal compensation coefficient of a linearity correction function to be used in the linearity compensation of the position error signal based on a maximum value and a minimum value of the square-root of sum of squares.

[Structure of Disk Drive]

FIG. 1 is a block diagram showing an essential part of a disk drive according to the present embodiment.

As shown in FIG. 1, broadly, the disk drive is comprised of a head-disk assembly (HDA), a head amplifier integrated circuit (hereinafter referred to as head amplifier IC) 11, a system controller 15, and a driver IC 18.

The HDA comprises a disk 1, which is a storage medium, a spindle motor (SPM) 2, an arm 3 with a head 10, and a voice coil motor (VCM) 4. The disk 1 is rotated by the spindle motor 2. The arm 3 and the VCM 4 constitute an actuator. The actuator controls the head 10 on the arm 3 to move to a designated position on the disk 1 by driving the VCM 4. The driving of the VCM 4 is controlled by a driving current from the driver IC 18.

A large number of tracks are formed on the disk 1. In each track, a plurality of servo areas (servo wedges) and a data area between each of the servo areas are provided. In the present embodiment, in each of the servo areas, a two-phase null servo pattern comprising first burst pattern (i.e., first burst signal pattern) N and second burst pattern (i.e., second burst signal pattern) Q is recorded as will be described later, wherein the burst patterns (i.e., burst signal patterns) in the adjacent tracks are mutually different in their phases with respect to a cross track direction.

The head 10 comprises a reader (or read head) 10R and a writer (or write head) 10W. The reader 10R reads the null servo pattern recorded in the servo area on the disk 1. Further, the reader 10R reads data recorded in the data area on the disk 1. The writer 10W writes data in the data area on the disk 1.

The head amplifier IC 11 amplifies a read signal (readback signal) read from the reader 10R, and transmits the read signal (readback signal) to a read/write (R/W) channel 12. Further, the head amplifier IC 11 supplies a write current according to write data output from the R/W channel 12 to the writer 10W.

The system controller 15 comprises a one-chip integrated circuit, and comprises the R/W channel 12, a hard disk controller (HDC) 13, a micro processor (MPU) 14, and a user-defined logic circuit (user-defined logic [UDL]), which is not shown. The R/W channel 12 comprises a read channel 12R and a write channel 12W. The read channel 12R executes demodulation processing of the read signal (output of the head amplifier IC 11) read from the reader 10R. The write channel 12W executes signal processing of the write data.

The HDC 13 comprises an interface controller which controls data transfer between a host 19 and the R/W 12. The HDC 13 controls a buffer memory (DRAM) 16 and a flash memory 17, and reads or writes the data.

The MPU 14 is a micro-controller and constitutes a servo system which executes positioning control (servo control) of the head 10 by controlling the VCM 4 through the driver IC 18. Further, the MPU 14 controls a read operation or a write operation of data on the disk 1 through the R/W channel 12.

[Configuration of Servo System]

FIG. 2 shows a configuration of the servo system accommodated in the disk drive of the present embodiment. As shown in FIG. 2, the servo system is comprised of a servo burst demodulator 20 included in the read channel 12R and the MPU 14.

As will be discussed later, the servo burst demodulator 20 demodulates the two-phase burst patterns N and Q included in the null servo pattern from the read signal (output of the head amplifier IC 11) read by the reader 10R. The magnetization patterns in the cross track direction of burst patterns N and Q have a phase difference of 90 degrees with respect to each other. The MPU 14 controls the reader 10R to be positioned at the target position of the track by using the position error signal (PES) demodulted based on burst patterns N and Q. Further, the servo area (servo wedge) includes Gray codes indicating an address of that track. In the present embodiment, demodulation processing of the Gray codes is omitted.

The servo burst demodulator 20 executes discrete Fourier transform (DFT) computation on a data sequence of the readback signal in the time domain, and outputs a demodulated signal as a result of the DFT computation. The real DFT in general refers to the operation of converting n items of time-series data into a total of n items of real data comprising (n/2−1) items of complex data of the first to (n/2−1) th order and the items of real data of order 0 and order n/2. However, the servo burst demodulator 20 of the present embodiment executes an arithmetic operation of obtaining only the complex data of one specific order (two items of real data). That is, the servo burst demodulator 20 outputs a demodulated signal 200 including a sine component and a cosine component of each of burst signals N and Q.

The MPU 14 achieves the functions of executing each kind of processing of initial phase compensation 21, rotation angle compensation 22, velocity compensation 23, and linearity compensation 24 with respect to the demodulated signal 200 output from the servo burst demodulator 20 by firmware. Each of the functions 21 to 24 achieved by the MPU 14 may be accomplished by a dedicated module embedded in the UDL as hardware instead of firmware.

As the initial phase compensation 21, the MPU 14 performs rotation processing with respect to the demodulated signal 200 such that the data is parallel to the real axis or the imaginary axis on a complex plane. That is, processing is performed such that the demodulated signal 200, which is the complex data, only has a real part or an imaginary part. As the rotation angle compensation 22, the MPU 14 executes the processing of compensating a rotation angle as will be described later with respect to a corrected signal (real data) 201 obtained after the compensation by the initial phase compensation 21. As the velocity compensation 23, the MPU 14 executes processing for the corrected signal (real data) obtained after the compensation by the rotation angle compensation 22 such that a substantially elliptical shape of N vs Q Lissajous is corrected to a substantially circular shape. As the linearity compensation 24, the MPU 14 performs the processing of compensating the linearity in regard to the actual change of position of the reader 10R with respect to the change in the signal (real data) obtained after the compensation by the velocity compensation 23, and outputting the position error signal (PES).

The MPU 14 calculates an optimal compensation coefficient of the linearity correction function in the linearity compensation 24. Further, the MPU 14 calculates an optimal rotation compensation angle to be used in the rotation angle compensation 22, as will be described later. In addition, the MPU 14 executes update processing of the optimal compensation coefficient and the optimal rotation compensation angle.

[Servo Demodulation Operation]

With reference to FIGS. 3A to 17, a servo demodulation operation of the present embodiment will be described.

First of all, FIG. 3A shows an example of the change in the position of reader 10R and the N and Q signals (signal 201 after the initial phase compensation) with respect to the relative postions in the cross track direction of the magnetization patterns, and FIG. 3B shows its Lissajous (N vs Q). It can be understood that in FIG. 3A, N and Q have a phase of 90 degrees. Also, it can be understood that the form of Lissajous of FIG. 3B is substantially square with rounded corners, and Lissajous has a rotation angle with respect to the N and Q-axes. As described above, while roundness of the corners or the rotation angle depend on a magnetization pattern distribution or a head sensitivity distribution of the reader 10R, they may also change by the pole tip protrusion (PTP).

The PTP is a phenomenon in which a tip portion of the head 10 protrudes by heat. By the PTP, a distance between the reader 10R and the surface of the disk 1 changes, in particular, and a servo demodulation result may be affected. FIGS. 3A and 3B are illustrations of the case where the PTP is 0.8.

That is, it has been confirmed that an amplitude ratio ($a_3/a_1$) or a rotation angle change depending on the PTP. For example, in the example shown in FIG. 3B, in the case where the PTP is 0.8, a Lissajous rotation angle is −16.2 degrees and the amplitude ratio ($a_3/a_1$) to be described later is 0.07. However, if the PTP is 0.4, the rotation angle is −5.4 degrees and the amplitude ratio ($a_3/a_1$) is 0.04. In this case, if the PTP is changed to 0.8 after the optimal compensation coefficient and the rotation compensation angle have been adjusted at the time when the PTP was 0.4, for example, the optimal compensation coefficient and the optimal rotation compensation angle deviate from the compensation coefficient and the rotation compensation angle which have been set. Accordingly, since the servo demodulation error (deviation) varies by the change in the PTP, it is desirable to update the optimal compensation coefficient and the rotation compensation angle. Hence, the MPU 14 of the present embodiment executes the processing of updating the optimal compensation coefficient and the rotation compensation angle in a relatively short time.

As mentioned above, in the present embodiment, a case where two null burst patterns N and Q are used will be described. Further, the present embodiment can be applied to an area servo pattern comprising four burst patterns A to D by making a conversion that N=A−B and Q=C−D.

In magnetization pattern period X in the cross track direction of null burst patterns N and Q, readback signal amplitudes N and Q at offset (position) x of the reader 10R are given by $$N(\phi)=a_1 \cos\phi-a_3 \cos(3\phi-4\theta_3)+a_5 \cos(5\phi-4\theta_5)-a_7 \cos(7\phi-8\theta_7)+\ldots \quad (1)$$

and $$Q(\phi)=a_1 \sin\phi+a_3 \sin(3\phi-4\theta_3)+a_5 \sin(5\phi-4\theta_5)+a_7 \sin(7\phi-8\theta_7)+\ldots \quad (2),$$

where $\phi$ is $2\pi x/X$.

Here, coefficients $a_1$, $a_3$, $a_5$, and $a_7$ correspond to amplitudes of the order 1, 3, 5, and 7 of an intensity change in the offset direction of N and Q, respectively. In addition, $\theta_3$, $\theta_5$, and $\theta_7$ correspond to a quarter of a phase of the third order with respect to the first order, a quarter of a phase of the fifth order with respect to the first order, and one eighth of a phase of the seventh order with respect to the first order, respectively.

Further, if coefficient $a_5$ and the subsequent coefficients are ignored because they are so small, the above equations can be simplified as $$N=a_1 \cos\phi-a_3 \cos(3\phi-4\theta) \quad (3)$$

and $$Q=a_1 \sin\phi+a_3 \sin(3\phi-4\theta) \quad (4),$$

where Lissajous rotation angle $\theta$ is $\theta_3$.

Here, if the sum of squares of each of N and Q is denoted as $S2^2$, for convenience, the sum can be represented as $$S2^2=N^2+Q^2=a_1^2+a_3^2-2a_1a_3\cos(4\phi-4\theta) \quad (5)$$

In this sum of squares $S2^2$, the maximum value $(a_1+a_3)^2$ can be calculated based on "$\phi=\theta+(2n+1)\pi/4$" derived from "$4(\phi-\theta)=(2n+1)\pi$". In addition, the minimum value $(a_1-a_3)^2$ can be calculated based on "$\phi=\theta+n\pi/2$" derived from "$4(\phi-\theta)=(2n)\pi$". The range of $\theta$ is $-\pi/4<\theta<+\pi/4$.

Here, in the condition that $\phi=\theta+(2n+1)\pi/4$ for calculating the maximum value $(a_1+a_3)^2$, the relationships as shown in the following equations (6) and (7) can be satisfied:

$$N=a_1 \cos(\theta+(2n+1)\pi/4)-a_3 \cos(3(2n+1)\pi/4-\theta) \quad (6)$$

$$Q=a_1 \sin(\theta+(2n+1)\pi/4)+a_3 \sin(3(2n+1)\pi/4-\theta) \quad (7)$$

Equations (6) and (7) can be rewritten as equations (8) to (19) below, by substituting 0 to 3 for n.

That is, when n is 0, the following equations (8) to (10) are obtained:

$$N=a_1\cos(\theta+\pi/4)-a_3\cos(3\pi/4-\theta)=(a_1+a_3)\cos(\theta+\pi/4) \quad (8)$$

$$Q=a_1\sin(\theta+\pi/4)+a_3\sin(3\pi/4-\theta)=(a_1+a_3)\sin(\theta+\pi/4) \quad (9)$$

$$N+Q=+\sqrt{2}(a_1+a_3)\cos(\theta), N-Q=-\sqrt{2}(a_1+a_3)\sin(\theta), Q/N=+\tan(\theta+\pi/4) \quad (10)$$

When n is 1, the following equations (11) to (13) are obtained:

$$N = a_1\cos\left(\theta + \frac{3\pi}{4}\right) - a_3\cos\left(\frac{9\pi}{4} - \theta\right) \quad (11)$$
$$= -(a_1 + a_3)\sin\left(\theta + \frac{\pi}{4}\right)$$

$$Q = a_1\sin\left(\theta + \frac{3\pi}{4}\right) + a_3\sin\left(\frac{9\pi}{4} - \theta\right) \quad (12)$$
$$= (a_1 + a_3)\cos\left(\theta + \frac{\pi}{4}\right)$$

$$N + Q = -\sqrt{2}\,(a_1 + a_3)\sin(\theta), \quad (13)$$
$$N - Q = -\sqrt{2}\,(a_1 + a_3)\cos(\theta),$$

-continued $$N/Q = -\tan\left(\theta + \frac{\pi}{4}\right)$$

When n is 2, the following equations (14) to (16) are obtained:

$$N = a_1\cos\left(\theta + \frac{5\pi}{4}\right) - a_3\cos\left(\frac{15\pi}{4} - \theta\right) \quad (14)$$
$$= -(a_1 + a_3)\cos\left(\theta + \frac{\pi}{4}\right)$$

$$Q = a_1\sin\left(\theta + \frac{5\pi}{4}\right) + a_3\sin\left(\frac{15\pi}{4} - \theta\right) \quad (15)$$
$$= -(a_1 + a_3)\sin\left(\theta + \frac{\pi}{4}\right)$$

$$N + Q = -\sqrt{2}\,(a_1 + a_3)\cos(\theta), \quad (16)$$
$$N - Q = +\sqrt{2}\,(a_1 + a_3)\sin(\theta),$$
$$Q/N = +\tan\left(\theta + \frac{\pi}{4}\right)$$

When n is 3, the following equations (17) to (19) are obtained:

$$N = a_1\cos\left(\theta + \frac{7\pi}{4}\right) - a_3\cos\left(\frac{21\pi}{4} - \theta\right) \quad (17)$$
$$= (a_1 + a_3)\sin\left(\theta + \frac{\pi}{4}\right)$$

$$Q = a_1\sin\left(\theta + \frac{7\pi}{4}\right) + a_3\sin\left(\frac{21\pi}{4} - \theta\right) \quad (18)$$
$$= -(a_1 + a_3)\cos\left(\theta + \frac{\pi}{4}\right)$$

$$N + Q = +\sqrt{2}\,(a_1 + a_3)\sin(\theta), \quad (19)$$
$$N - Q = +\sqrt{2}\,(a_1 + a_3)\cos(\theta),$$
$$N/Q = -\tan\left(\theta + \frac{\pi}{4}\right)$$

Further, in the range of $-\pi/4<\theta<+\pi/4$, $\cos(\theta+\pi/4)>0$ and $\sin(\theta+\pi/4)>0$.

Therefore, in N and Q with the maximum value, if $S3=N-Q$ where $N>0,Q>0$, if $S3=N+Q$ where $N<0,Q>0$, if $S3=-N+Q$ where $N<0,Q<0$, if $S3=-N-Q$ where $N>0,Q<0$, or if $S3=0.0$ in any other conditions, the relationship as shown in the following equation (20) can be satisfied:

$$S3 = (a1 + a3) \times \left(\cos\left(\theta + \frac{\pi}{4}\right) - \sin\left(\theta + \frac{\pi}{4}\right)\right) \quad (20)$$
$$= -\sqrt{2} \times (a1 + a3) \times \sin(\theta)$$

Furthermore, if $S4=Q/N$ where $N>0$, $Q>0$, if $S4=-N/Q$ where $N<0$, $Q>0$, if $S4=Q/N$ where $N<0$, $Q<0$, if $S4=-N/Q$ where $N>0$, $Q<0$, or if $S4=0.0$ in any other conditions, the relationship as shown in the following equation (21) can be satisfied:

$$S4=\tan(\theta+\pi/4) \quad (21)$$

However, in this case, $0<(\theta+\pi/4)<\pi/2$. In the range of $\pi/4<(\theta+\pi/4)<\pi/2$, accuracy of arctan is decreased. Therefore, by utilizing the formula $\tan(\theta+\pi/4)=1/\tan(\pi/4-\theta)$, $\theta$ is set to $\arctan(S4)-\pi/4$ in the condition that $|S4|<=1.0$, and to $\pi/4-\arctan(1/S4)$ in the other conditions. Practically, in order to secure accuracy by division, in the condition that $|N|>|Q|$, $S4=Q/N$, and in the other conditions, $S4=-N/Q$. Further, in the condition that $S4>0.0$, $\theta$ is set to $\arctan(S4)-\pi/4$, and to $\pi/4+\arctan(S4)$ in the other conditions.

If rotation compensation angle $\theta\approx0$, $S4\approx\pm1$, which would be inconvenient to obtain an average of measurement performed several times. Therefore, it is preferable that $\theta$ be set to arctan $(S4)$ where $S4=(Q-N)/(N+Q)$ in the condition that $|N+Q|>|N-Q|$, or $S4=(N+Q)/(N-Q)$ in the other conditions.

On the other hand, in the condition "$\phi=\theta+n\pi/2$" for calculating the minimum value $(a_1-a_3)^2$, the relationships as shown in the following equations (22) and (23) can be satisfied:

$$N=a_1\cos\phi-a_3\cos(3\phi-4\theta)=a_1\cos(\theta+n\pi/2)-a_3\cos(3n\pi/2-\theta) \quad (22)$$

$$Q = a_1\sin\varphi + a_3\sin(3\varphi + 4\theta) \quad (23)$$
$$= a_1\sin\left(\theta + \frac{n\pi}{2}\right) + a_3\sin\left(\frac{3n\pi}{2} - \theta\right)$$

Equations (22) and (23) can be rewritten as equations (24) to (31) below, by substituting 0 to 3 for n.

That is, when n is 0, the following equations (24) and (25) are obtained:

$$N=a_1\cos(\theta)-a_3\cos(-\theta)=(a_1-a_3)\cos(\theta) \quad (24)$$

$$Q=a_1\sin(\theta)+a_3\sin(-\theta)=(a_1-a_3)\sin(\theta) \quad (25)$$

When n is 1, the following equations (26) and (27) are obtained:

$$N=a_1\cos(\theta+\pi/2)-a_3\cos(3\pi/2-\theta)=-(a_1-a_3)\sin(\theta) \quad (26)$$

$$Q=a_1\sin(\theta+\pi/2)+a_3\sin(3\pi/2-\theta)=(a_1-a_3)\cos(\theta) \quad (27)$$

When n is 2, the following equations (28) and (29) are obtained:

$$N=a_1\cos(\theta+\pi)-a_3\cos(3\pi-\theta)=-(a_1-a_3)\cos(\theta) \quad (28)$$

$$Q=a_1\sin(\theta+\pi)+a_3\sin(3\pi-\theta)=-(a_1-a_3)\sin(\theta) \quad (29)$$

When n is 3, the following equations (30) and (31) are obtained:

$$N=a_1\cos(\theta+3\pi/2)-a_3\cos(9\pi/2-\theta)=(a_1-a_3)\sin(\theta) \quad (30)$$

$$Q=a_1\sin(\theta+3\pi/2)+a_3\sin(9\pi/2-\theta)=-(a_1-a_3)\cos(\theta) \quad (31)$$

Further, in the range of $-\pi/4<\theta<+\pi/4$, $|\cos(\theta)|>|\sin(\theta)|$. Therefore, if $S5=Q/N$ in the condition that $|N|>|Q|$, or $S5=-N/Q$ in the other conditions, $S5=\tan(\theta)$.

As described above, the output 201 by the initial phase compensation function 21 at position x of the reader 10R can be expressed as generalized formulae as shown in equations (1) and (2), and as simplified formulae as shown in equations (3) and (4).

The MPU 14 calculates the sum of squares, i.e., $S2^2=N^2+Q^2$, as shown in equation (5), from the signal output (real data) 201 from the initial phase compensation function 21, and monitors its change. The MPU 14 calculates the maximum value $(S2MAX)^2$ and the minimum value $(S2MIN)^2$ of the samples from the value of sum of squares ($S2^2$). That is, the maximum value $(S2MAX)^2$ is the maximum value $(a_1+a_3)^2$, and the minimum value $(S2MIN)^2$ is the minimum value $(a_1-a_3)^2$ described above in connection with the above equation (5). Accordingly, the MPU 14 can calculate (estimate) the amplitude values $a_1$ and $a_3$ of the first-order component and the third-order component of the N and Q signals as shown in the following equations (32) and (33):

$$a_1=(S2MAX+S2MIN)/2 \tag{32}$$

$$a_3=(S2MAX-S2MIN)/2 \tag{33}$$

That is, the MPU 14 outputs the position error signal (PES) by compensating the linearity with respect to the actual position change of the reader 10R by the function of the linearity compensation 24. Here, the MPU 14 calculates the optimal compensation coefficient of the linearity correction function in the linearity compensation 24. In this case, by calculating the amplitude values $a_1$ and $a_3$, it is possible to determine the optimal compensation coefficient of the linearity correction function (specific example thereof will be described later) from the value of $a_3/a_1=(S2MAX-S2MIN)/(S2MAX+S2MIN)$.

Therefore, the MPU 14 can update the optimal compensation coefficient based on the amplitude ratio $a_3/a_1$ according to the change in the maximum value and the minimum value of the sum of squares. Further, the amplitude ratio $a_3/a_1$ means a ratio of the third-order component amplitude $a_3$ to the first-order component amplitude $a_1$. Further, by updating S3 when updating the maximum value, the MPU 14 can determine and update the rotation compensation angle θ from $$\theta = \arcsin(-S3/\sqrt{2}/(a_1+a_3)).$$

Further, by updating S4 when updating the maximum value, the rotation compensation angle θ can be determined and updated from θ=arctan(S4). In this case, the value of $(a_1+a_3)$ is unnecessary. On the other hand, by updating S5 when updating the minimum value, it is possible to determine and update the rotation compensation angle θ from θ=arctan(S5). Also in this case, the value of $(a_1+a_3)$ is unnecessary.

Further, arcsin and arctan have relatively good linearity in the range $-\pi/4<\theta<+\pi/4$, and in this range, a simple approximate calculating formula is prepared. Therefore, by using the approximate calculating formula, the MPU 14 can easily obtain the rotation compensation angle θ even during operation after shipment of the disk drive. Further, since the rotation compensation angle θ uses the values of sin θ and cos θ, instead of calculating θ from arctan(S4), θ may be calculated by directly obtaining sin θ and cos θ by using a square root routine from S4 (=tan θ).

Furthermore, the head 10 surely passes the points of S2MAX and S2MIN while it moves a distance more than a quarter of a magnetization pattern period in the cross track direction. Therefore, if the sampling point when the head 10 passes is close to these points, the MPU 14 can obtain a value close to S2MAX and a value close to S2MIN. If the head 10 is seeking, the head 10 passes through many magnetization patterns, and if a virtual track control (i.e. a virtual circle control) is used, the head 10 crosses many magnetization patterns when the head 10 is on the track. Further, some movement occurs even after a head switching operation, and in a settled state after a seek, the head 10 travels more than a quarter of the magnetization pattern relatively slowly. Therefore, it is easy for the MPU 14 to find S2MAX and S2MIN.

In short, whether sampling can be performed near S2MAX and S2MIN depends on a probability. Therefore, the MPU 14 should preferably update the optimal compensation coefficient and the rotation compensation angle by an update interval which is greater than a predetermined number of servo sampling. For example, if 400 servo areas 100 are arranged on one track on the disk 1, in a sixteenth track sampling, it is expected that the optimal compensation coefficient and the rotation compensation angle come close to S2MAX and S2MIN with an accuracy of 1/(400/16×4)=1% on the average. The MPU takes this number of servo sampling as one search set. Further, as described above, since the optimal compensation coefficient varies depending on the PTP, etc., the optimal compensation coefficient should preferably be updated based on the sampling counted in those phenomena. Further, since the present method detects a local maximum or a local minimum, the method is affected by noise. Therefore, the MPU 14 should preferably execute several search sets, remove extreme values from the values obtained in each of the search sets, and update the optimal compensation coefficient by using a median and an average value as well.

FIGS. 4A to 20K will now be described specifically over the principle description of the present embodiment given above.

FIGS. 4A and 4B show examples of a probability density of S2MAX and S2MIN with respect to the number of samples n (here, n=8, n=100). Further, each of S2MAX and S2MIN is a square root of the maximum value and the minimum value of the number of samples calculated from the sum of squares ($S2^2$) stated above. FIGS. 4A and 4B show specific examples of the cases where Gaussian noise (additive white Gaussian noise [AWGN]) is superimposed on the N and Q signals with respect to position x which changes randomly where the amplitude ratio $a_3/a_1$ is 0.1, as the probability density of S2MAX and S2MIN.

Here, if amplitude ratio $a_1$ is 1, S2MAX is true value 1.1, and S2MIN is true value 0.9. If there is no noise, S2MAX is a value less than or equal to true value 1.1, and S2MIN is a value greater than or equal to true value 0.9. Further, the larger the number of samples n is, the higher the probability density of S2MAX and S2MIN is at the true values. On the other hand, if there is noise, S2MAX and S2MIN distribute over and below the true values. The larger the noise is and the larger the number of samples n is, the more the peak of the probability density is away from the true values.

FIGS. 6A to 6F and FIGS. 7A to 7F are specific examples showing changes in the measured values of S2MAX and S2MIN with respect to the noise. FIGS. 6A to 6F show the specific examples of the case where the amplitude ratio $a_3/a_1$ is 0.05, and FIGS. 7A to 7F show the specific examples of the case where the amplitude ratio $a_3/a_1$ is 0.10.

Figure 6E:
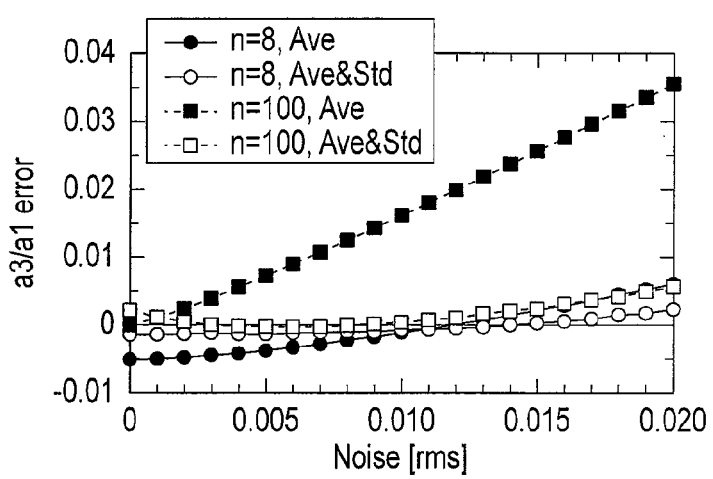
Figure 6F:
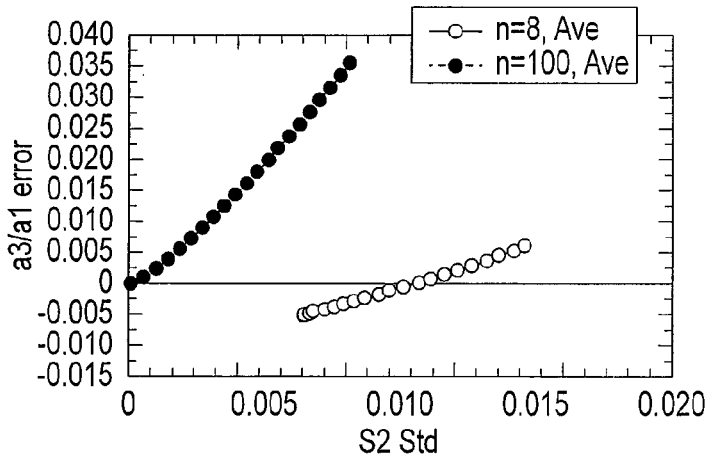
Figure 7A:
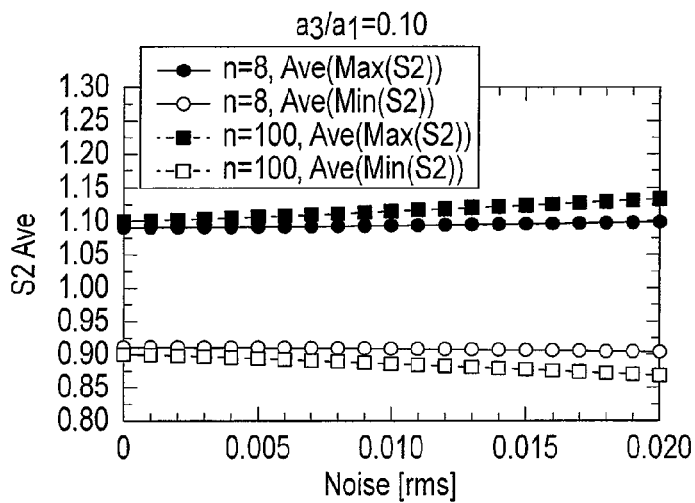
FIGS. 7A, 7B, 7C, 7D, 7E and 7F are figures showing changes in the observed values of S2MAX and S2MIN with respect to noise as specific examples of the embodiment.
Figure 7B:
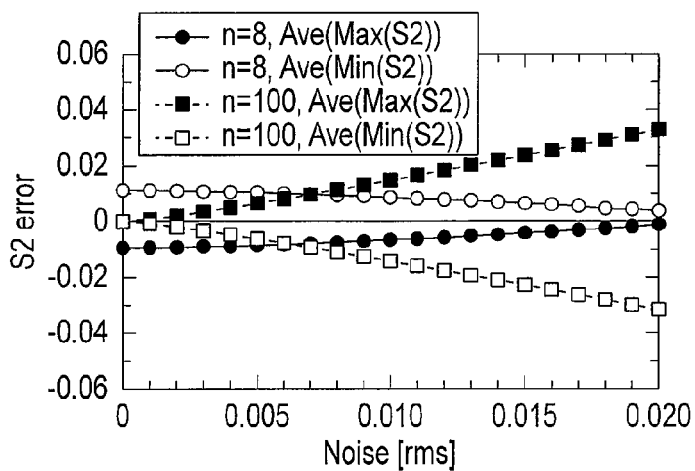
Figure 7C:
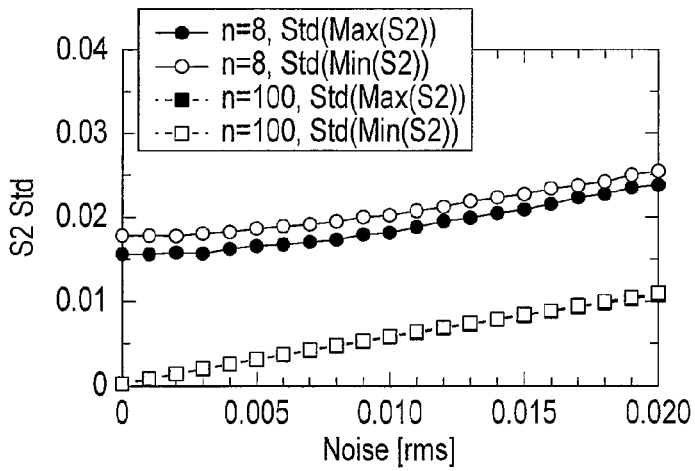
Figure 7D:
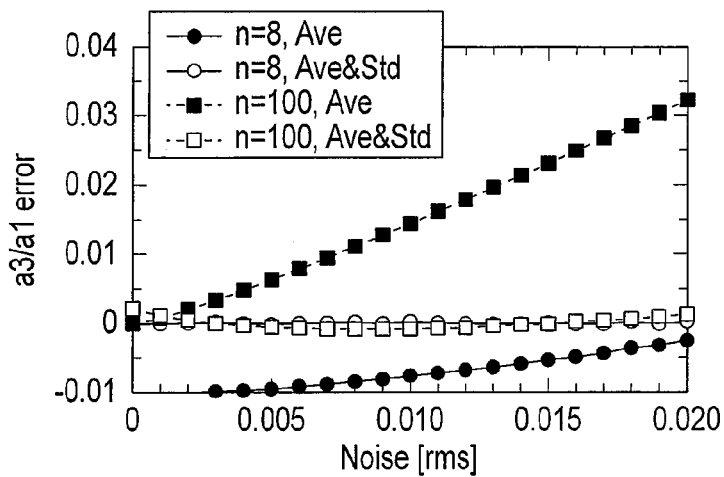
Figure 7E:
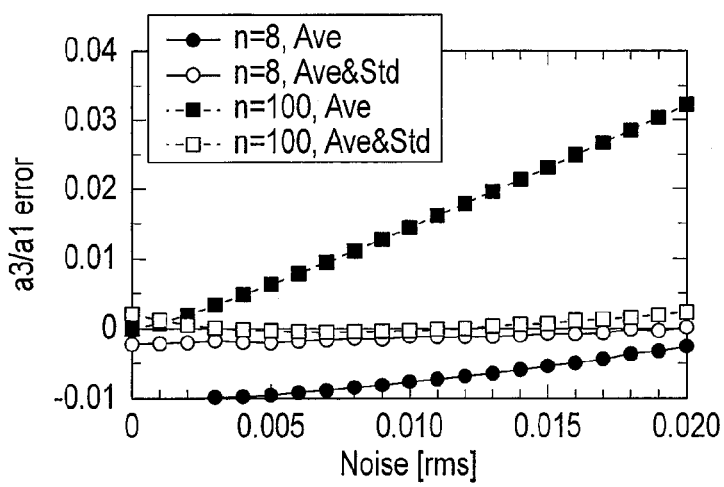
Figure 7F:
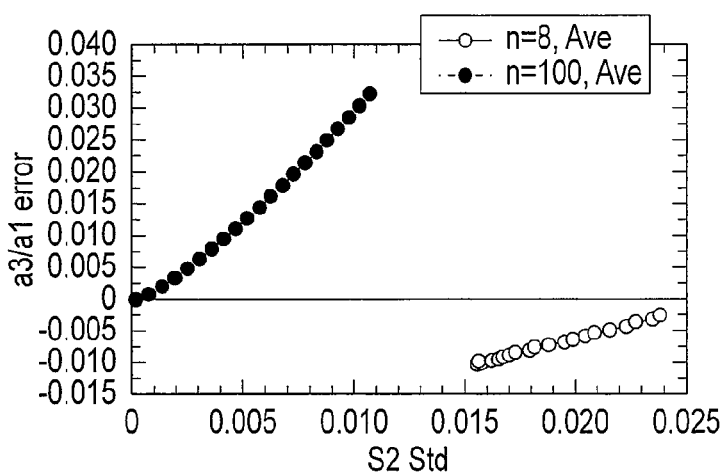

Each of FIGS. 6A, 7A is the figure showing the average values of S2MAX and S2MIN. As shown in FIGS. 6B and 7B, errors of the average values of S2MAX and S2MIN from the true values vary substantially linearly with respect to the noise. Here, FIGS. 6D and 7D are the figures in which the amplitude ratio $a_3/a_1$ is calculated from the average values of S2MAX and S2MIN, and errors from the average values are plotted by filled circles. Further, as shown in FIGS. 6C and 7C, a standard deviation of S2MAX and S2MIN also varies substantially linearly with respect to the noise. From these matters, as shown in FIGS. 6F and 7F, the standard deviation of S2MAX and S2MIN and the estimated error of the amplitude ratio $a_3/a_1$ have substantially a linear relationship. Therefore, the relationship of these can be approximated by correction linear function $Y=a \times X+b$. As shown in FIGS. 6D and 7D, the errors which have been plotted by the filled circles are corrected with the correction linear function, and those corrected errors are plotted by open circles. That is, the estimated errors are substantially zero. Further, as shown in FIGS. 6F and 7F, the correction linear function expression differs according to the number of samples n, and the plotting which has been corrected with the correction linear function differs according to the amplitude ratio $a_3/a_1$.

FIGS. 9A and 9B are the figures which show compensation coefficients a and b with respect to the amplitude ratio $a_3/a_1$ in the correction linear function. As shown in FIG. 9A, compensation coefficient a can be substantially approximated by a quadratic function with respect to the amplitude ratio $a3/a_1$. Further, as shown in FIG. 9B, compensation coefficient b can be substantially approximated by a linear function with respect to the amplitude ratio $a_3/a_1$. FIG. 10 shows an example of coefficients (a0, a1, a2, b0, b1) in an approximate expression regarding compensation coefficient a, b according to the value of N in the correction linear function.

Meanwhile, FIGS. 5A and 5B show examples of probability density of S4, S5 regarding the aforementioned rotation compensation angle $\theta$ with respect to the number of samples n (here, n=8, n=100). In FIGS. 5A and 5B, a thick line shows the probability density of S4 when the number of samples n=100, and a thin line shows the probability density of S5 when the number of samples n=100. Further, FIGS. 8A to 8F are specific examples showing changes in the observed values of S4, S5 with respect to noise. As shown in FIGS. 5A, 5B and FIGS. 8A to 8F, a peak of the probability density is not away from the true value. That is, the less the noise is and the larger the number of samples n is, the higher the probability density becomes for the peak to be the true value. Further, since a standard deviation under a similar condition becomes small, there is no need to perform processing as performed in estimating the amplitude ratio $a_3/a_1$.

Figure 11A:
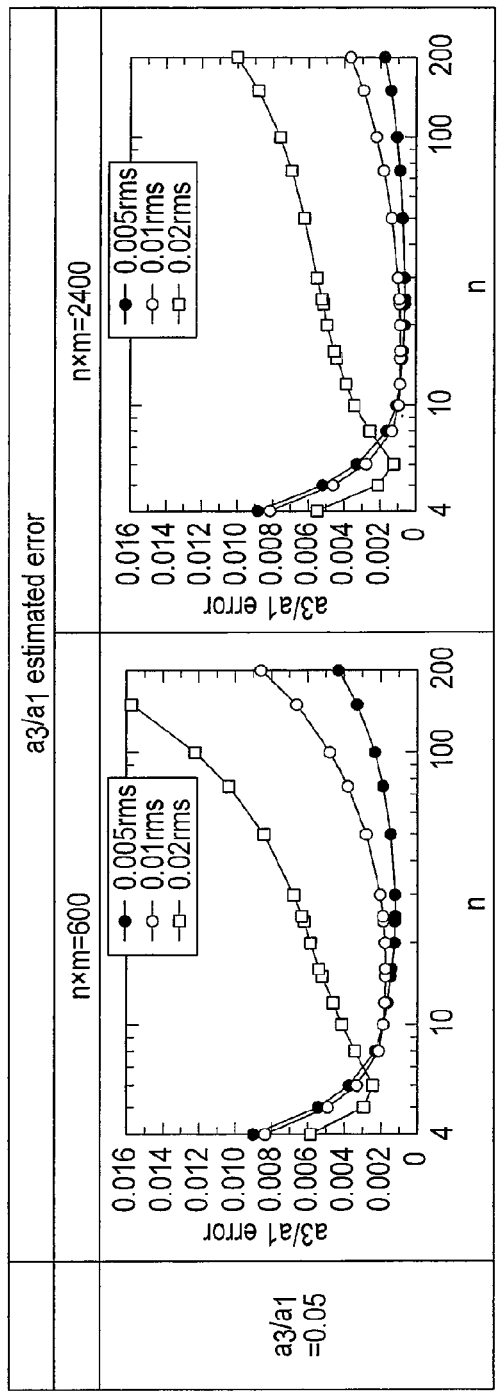
FIGS. 11A and 11B are figures for explaining an amplitude ratio estimated error with respect to the number of samples as specific examples of the embodiment.
Figure 11B:
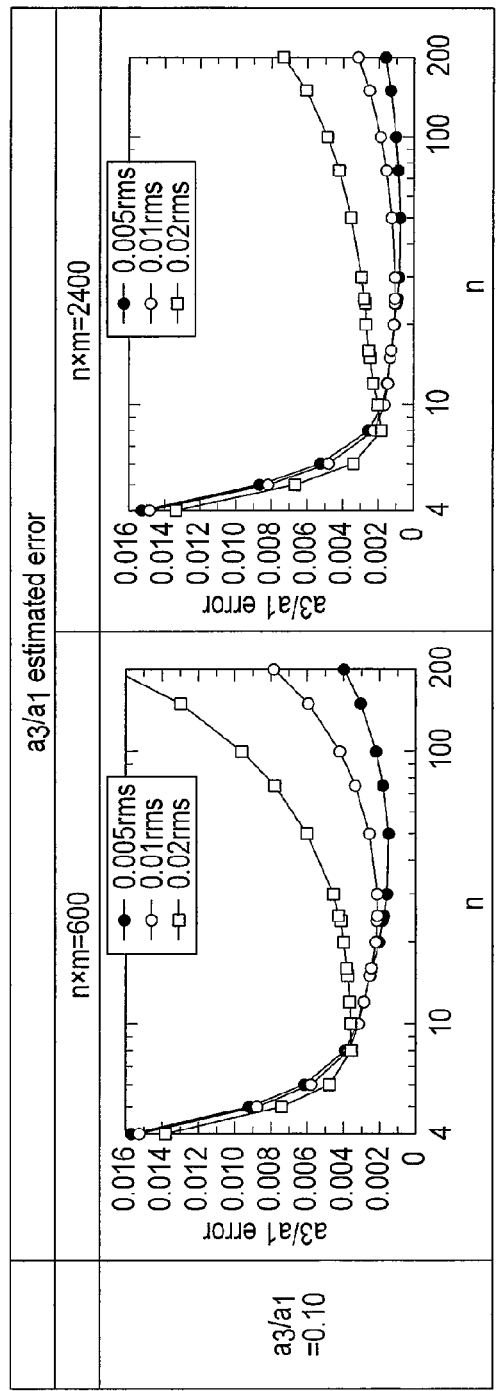
Figure 14A:
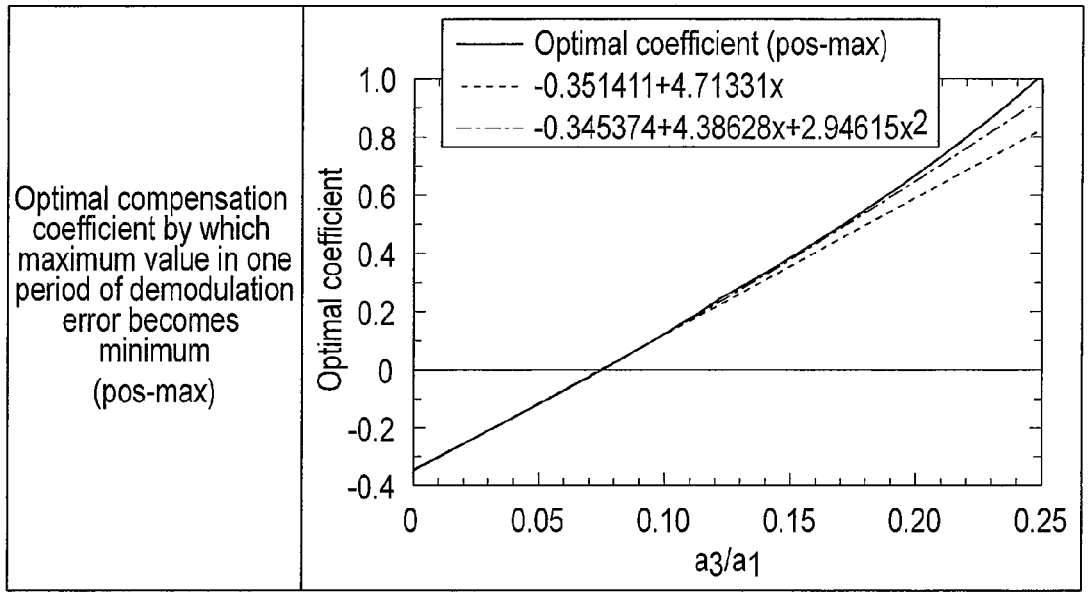
Figure 14B:
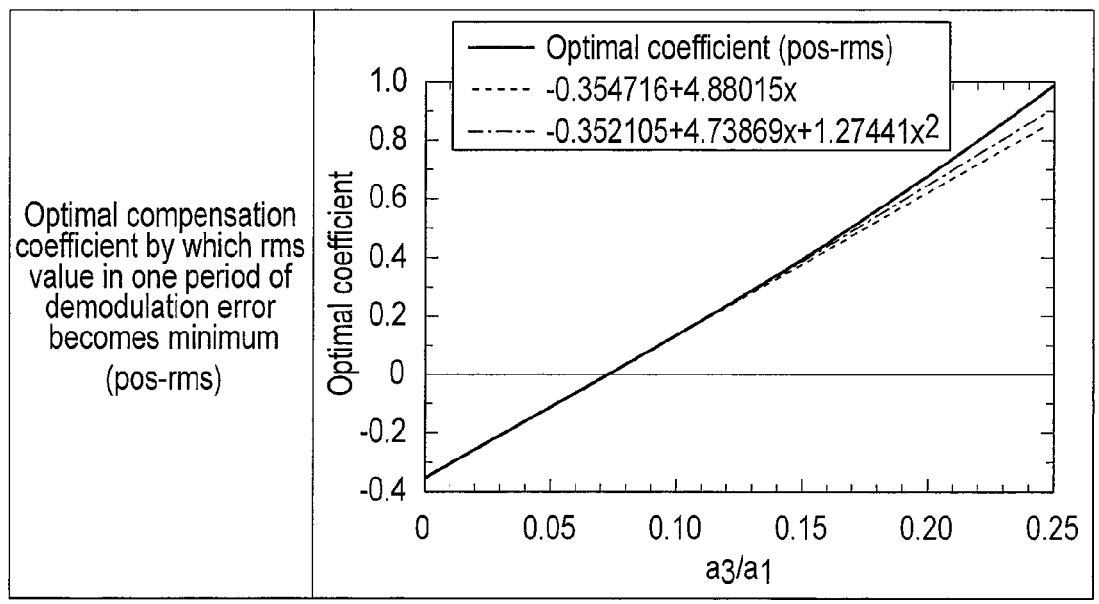
Figure 15A:
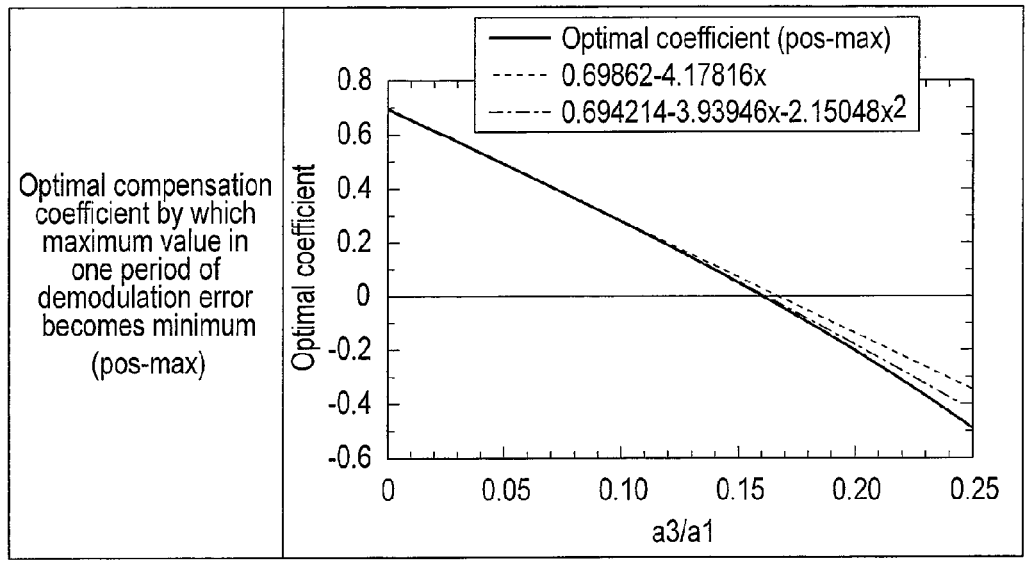
Figure 15B:
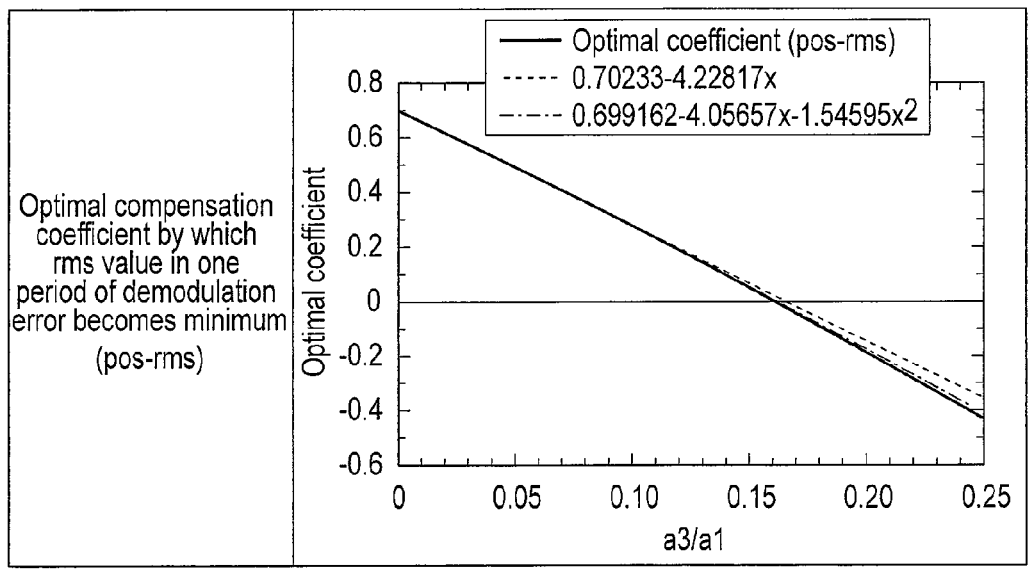
Figure 16A:
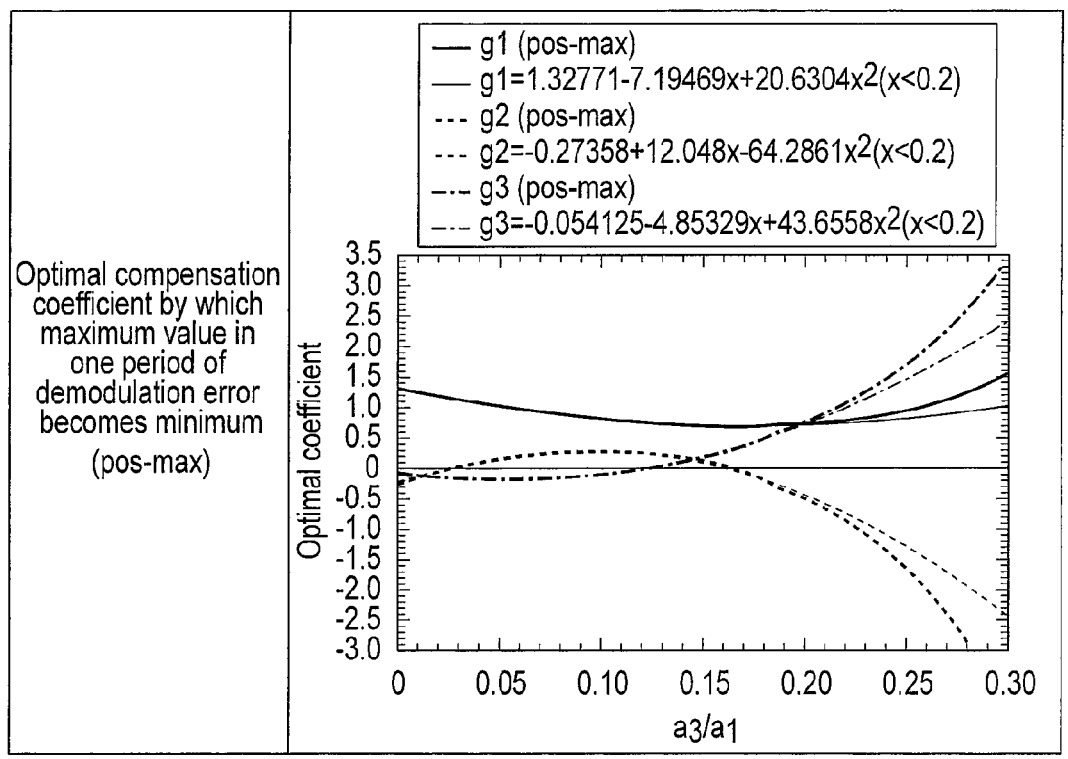
FIGS. 16A, 16B, 16C and 16D are figures for explaining an optimal compensation coefficient with respect to the amplitude ratio as specific examples of the embodiment.
Figure 16B:
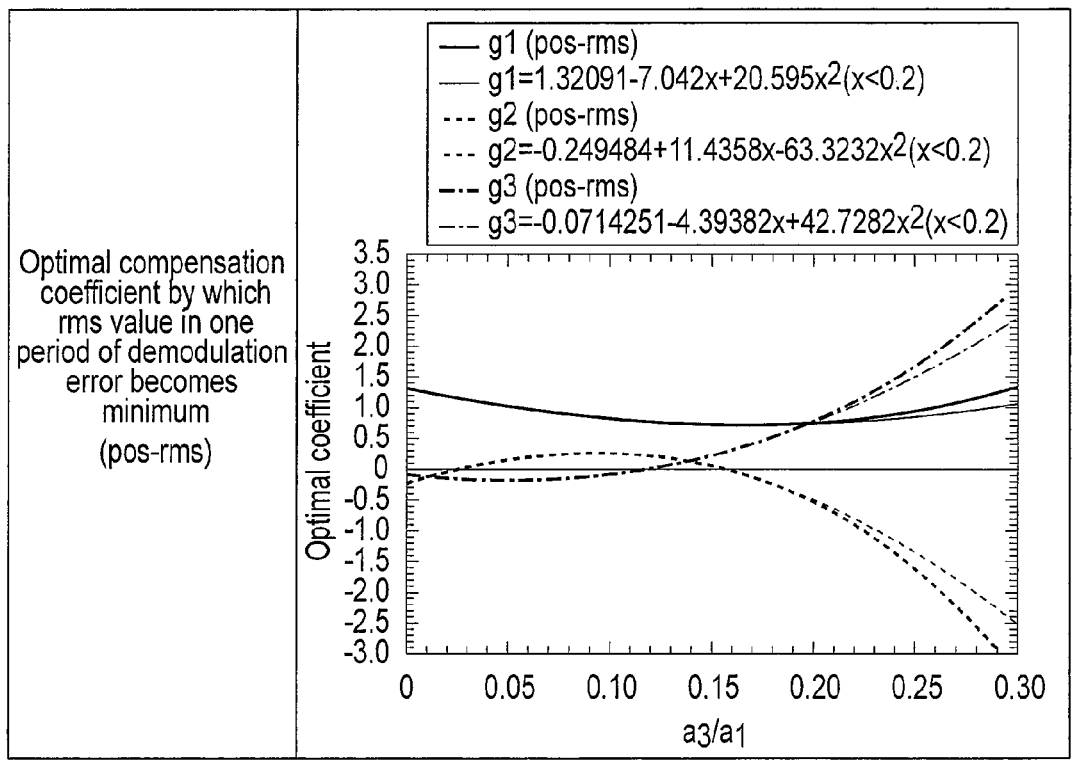
Figure 16C:
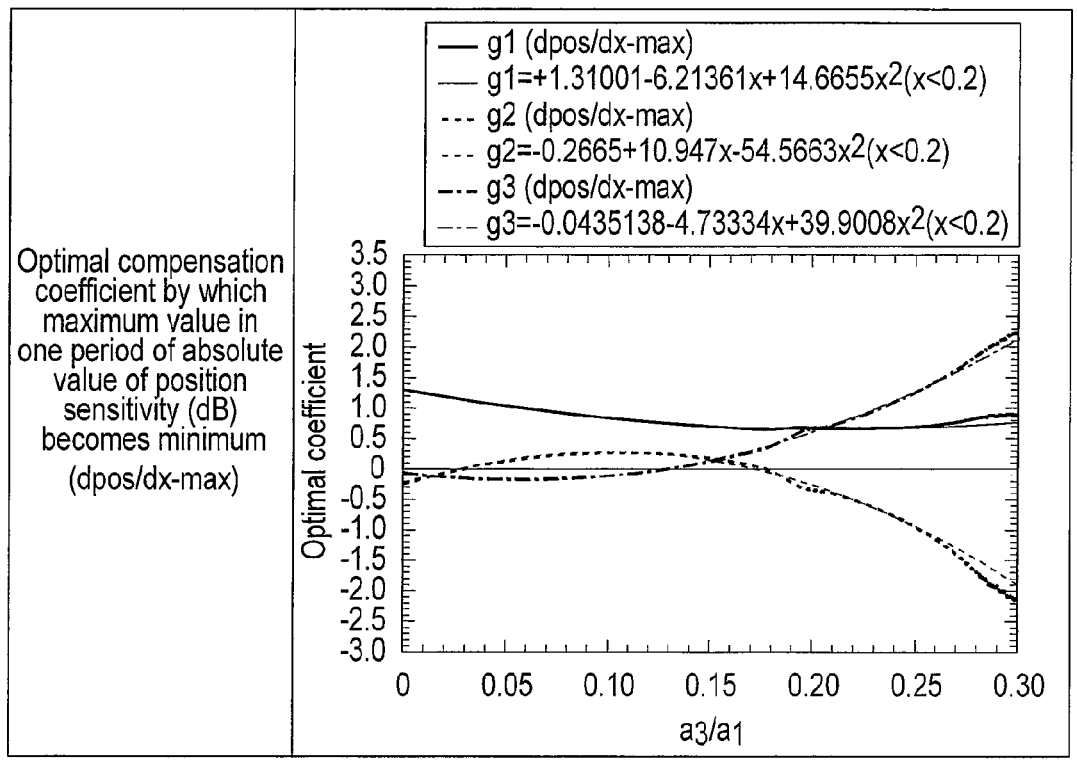
Figure 16D:
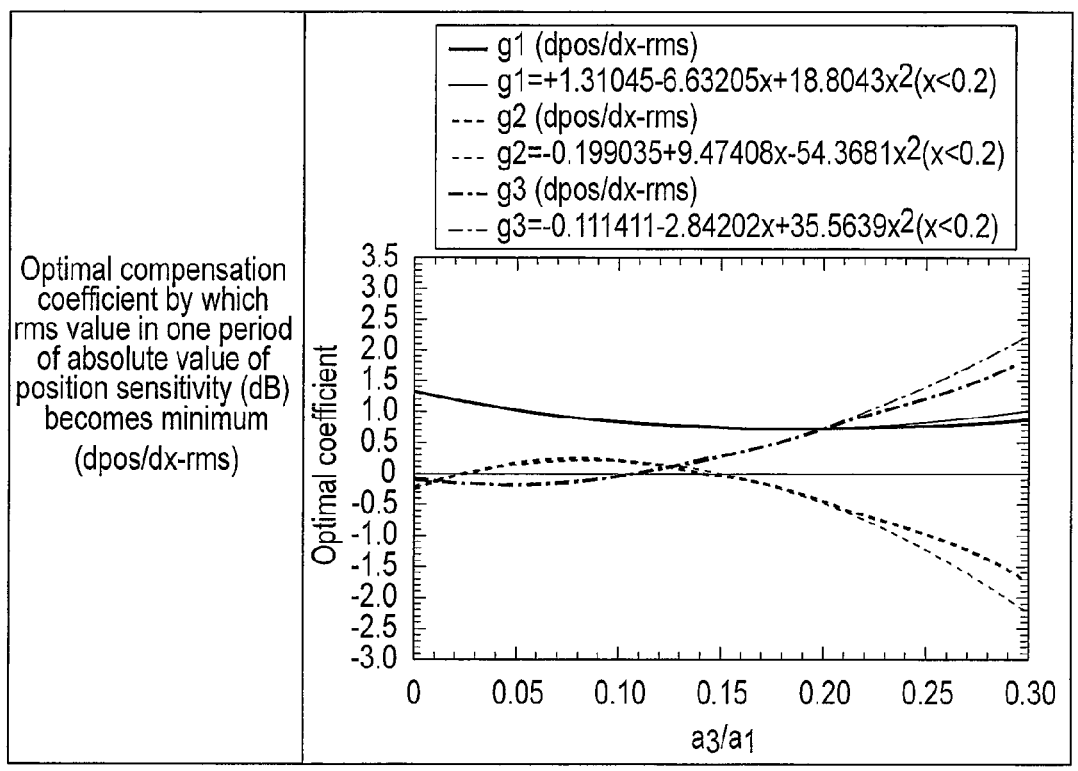
Figure 18G:
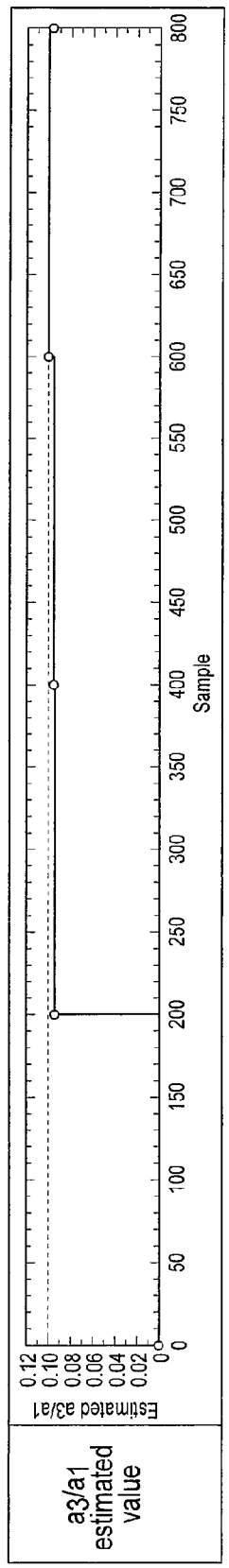
Figure 18H:
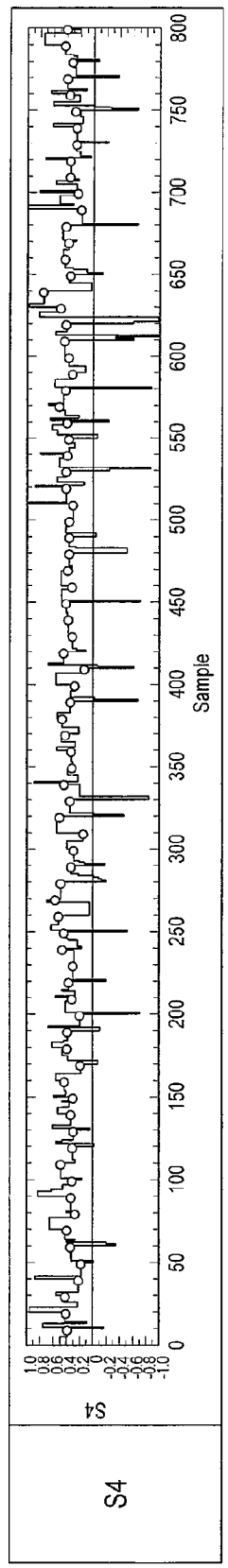
Figure 18I:
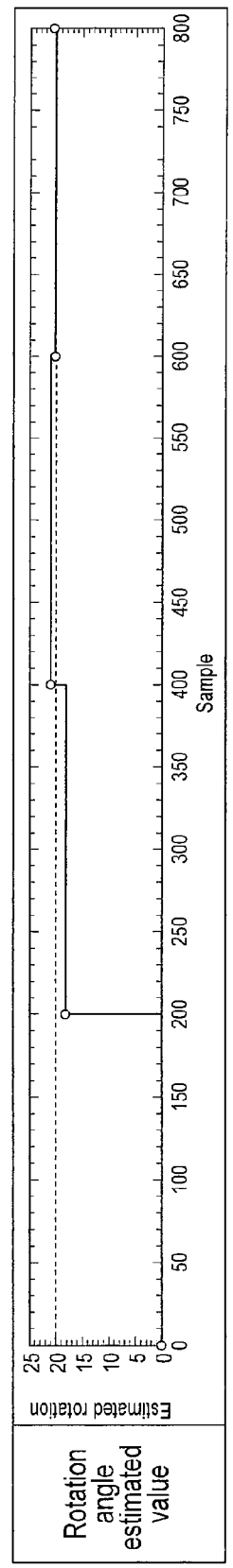
Figure 18J:
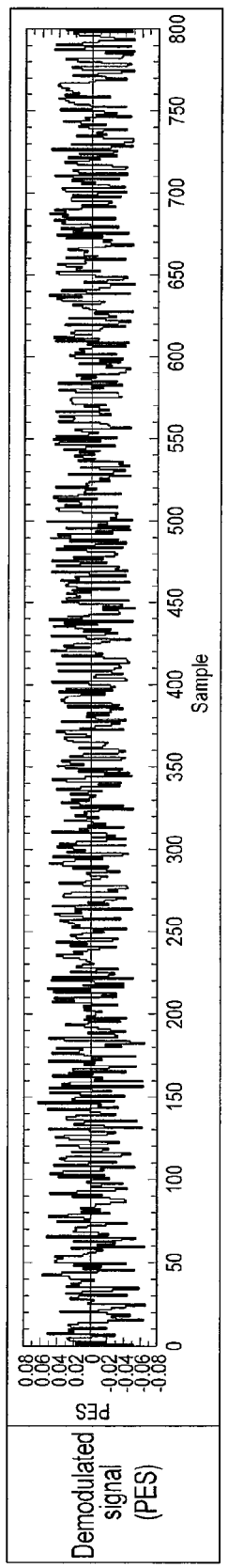
Figure 18K:
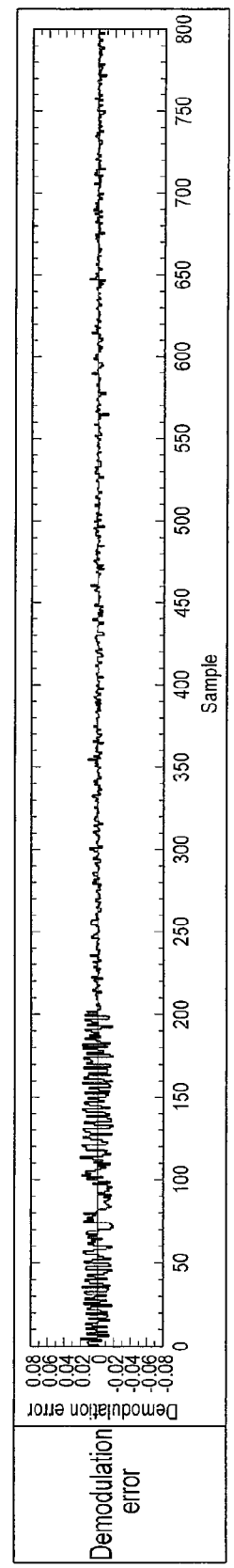
Figure 19D:
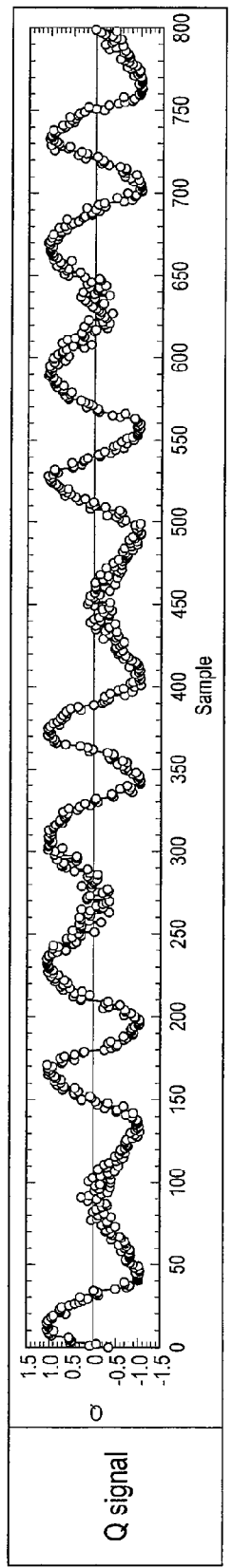
Figure 19E:
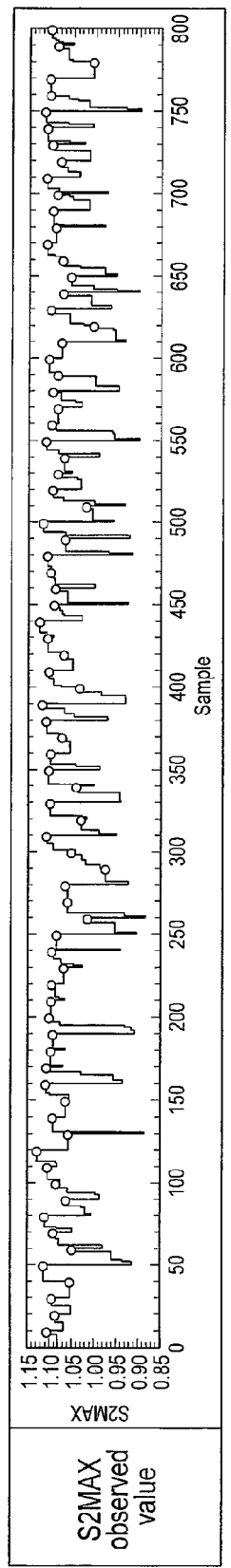
Figure 19F:
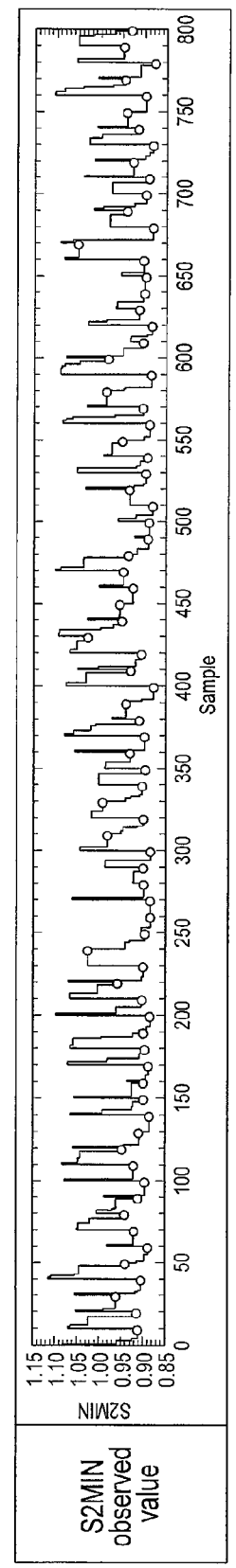
Figure 19G:
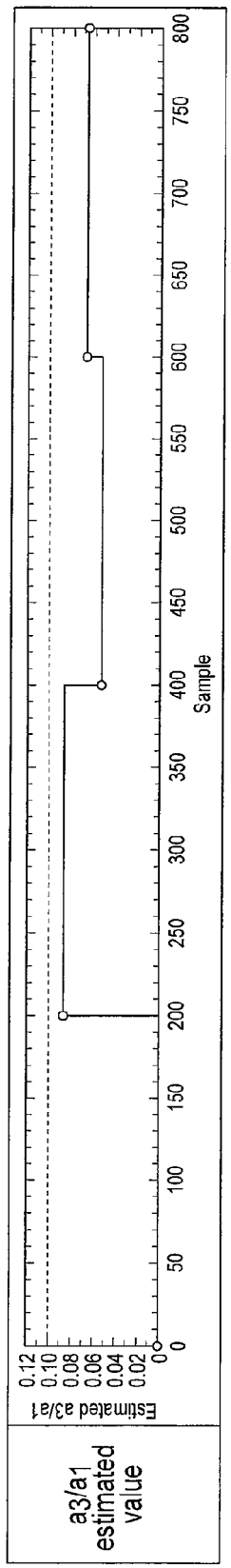
Figure 19H:
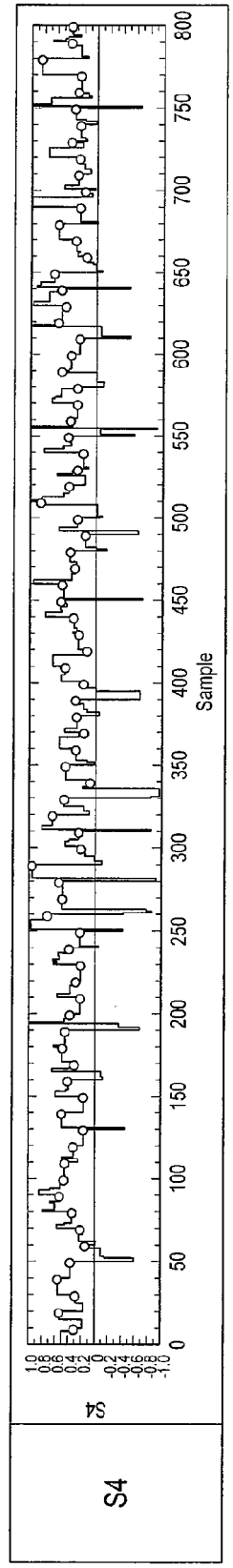
Figure 19I:
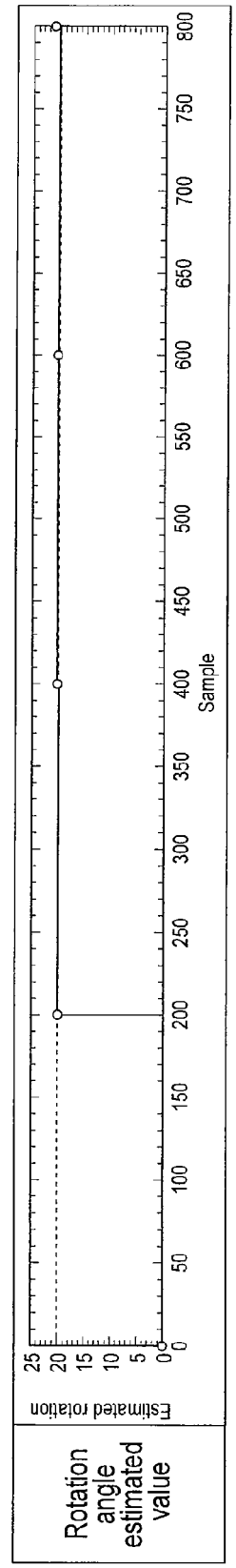
Figure 20D:
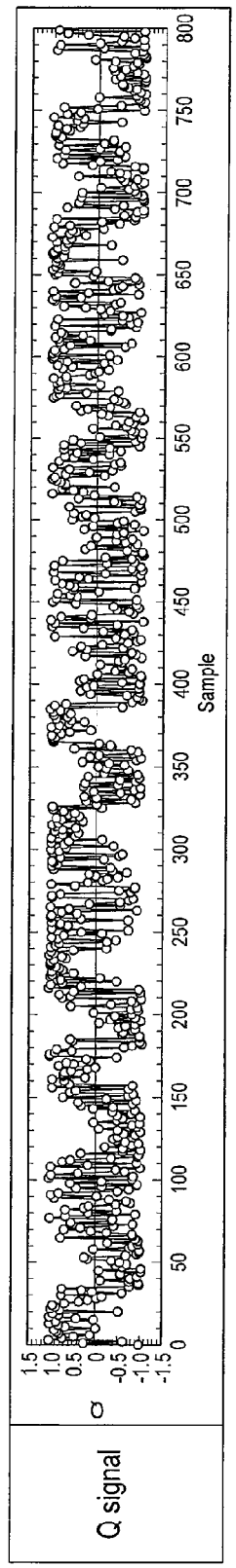
Figure 20E:
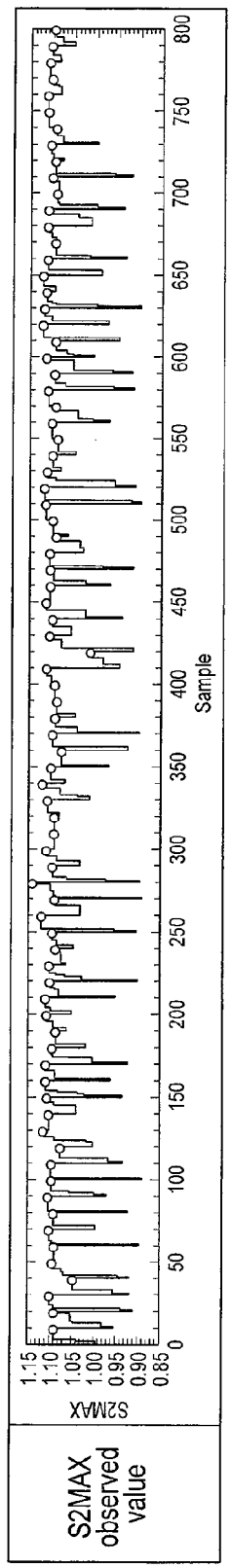
Figure 20F:
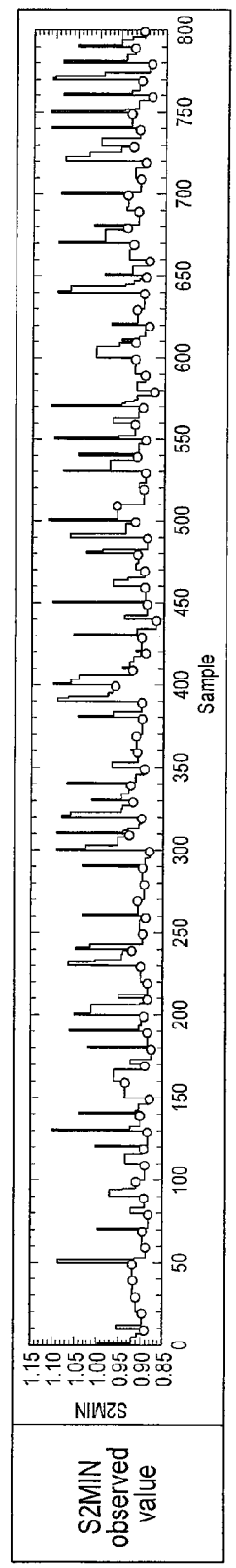
Figure 20G:
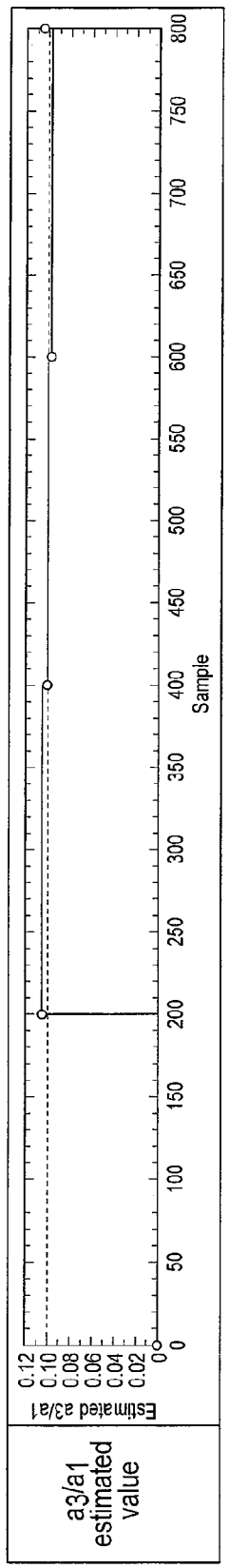
Figure 20H:
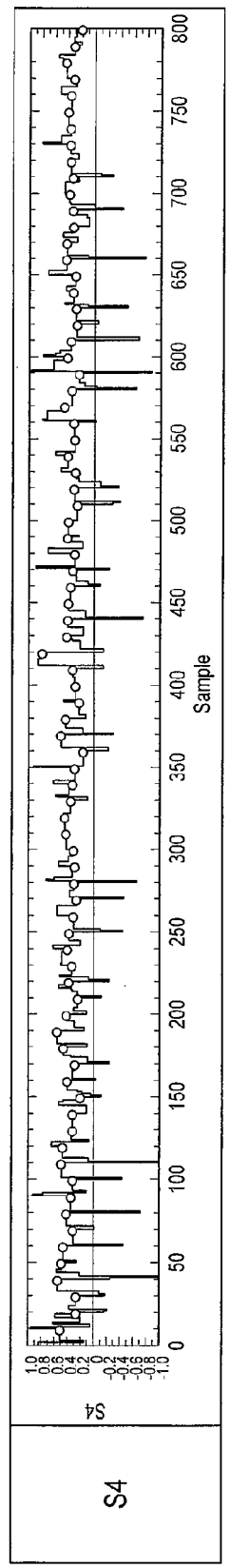
Figure 20I:
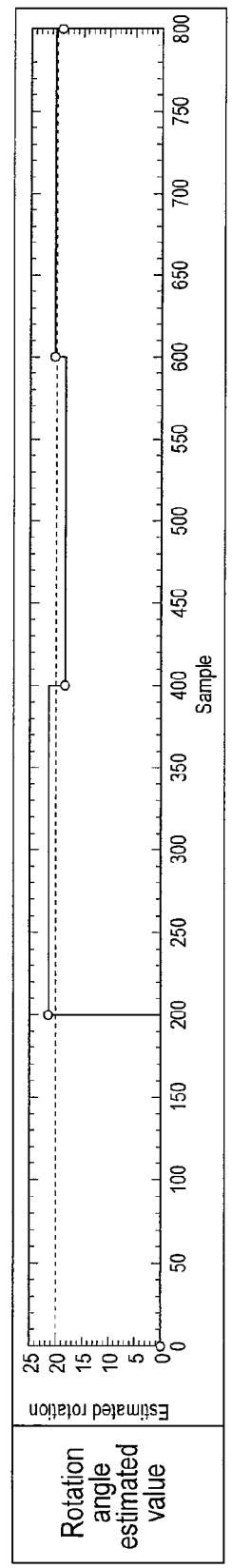
Figure 20J:
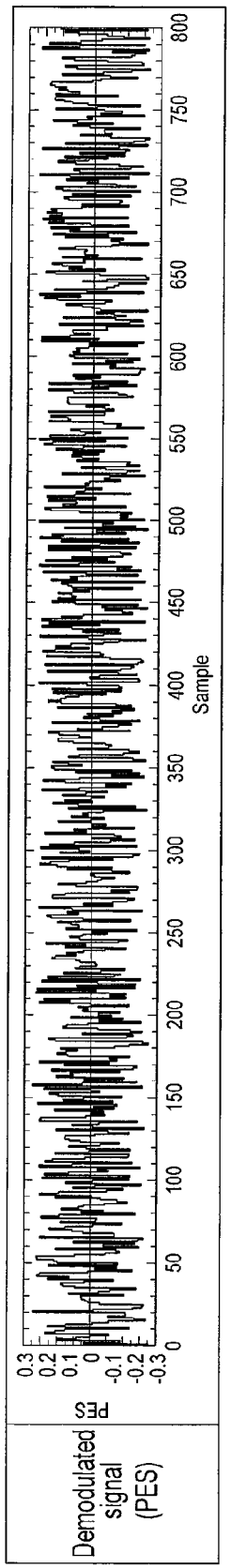
Figure 20K:
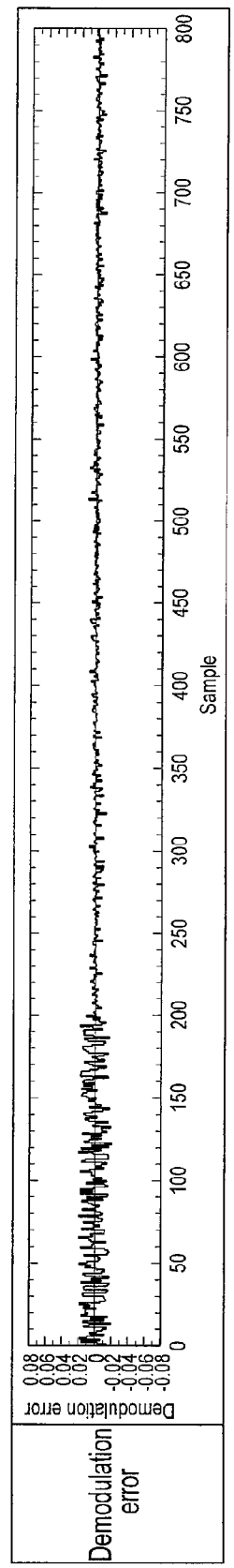

FIGS. 11A and 11B are the figures showing an estimated error of the amplitude ratio $a_3/a_1$ with respect to the number of samples. In this case, the estimated error of the amplitude ratio $a_3/a_1$ with respect to the total number of samples (n×m=600, 2400) as the sample count is indicated by a standard deviation (1σ value=root mean square [rms] value). The total number of samples is the product of the number of samples n of an inner loop and the repeat count m of an outer loop in the flowchart of FIG. 17 to be described later. As shown in FIGS. 11A and 11B, although the optimum value differs according to the amplitude ratio $a_3/a_1$ and the noise level, a good estimated error is shown around n=6 to 50. It is preferred that n is increased when the noise level is low, and decreased when the noise level is high. For example, in the case where the noise level is approximately 0.01 rms, 1σ is equal to approximately 0.002. Therefore, it can be expected that even if the noise level is 5σ, the error can be reduced to 0.01 or so.

FIGS. 12A and 12B are the figures showing an estimated error of the rotation angle by S4 with respect to sample count n. Further, FIGS. 13A and 13B are the figures showing an estimated error of the rotation angle by S5 with respect to sample count n. In either cases, a good characteristic is shown around n=6 to 50 as the optimal value of n. Further, as in the estimation of amplitude ratio $a_3/a_1$, the figures show a tendency that it is better to increase n when the noise level is low, and decrease n when the noise level is high.

As described above, if the amplitude ratio $a_3/a_1$ can be estimated, the optimal compensation coefficient of the linearity correction function to be applied based on the estimated value can be calculated.

As a specific example, FIGS. 14A to 14D show an example of a calculation result of the optimal compensation coefficient with respect to the amplitude ratio $a_3/a_1$ when the linearity correction function "$(1-G_m) \cdot r + G_m \cdot r^2$" described in United States Patent Application US2012/0293885 is applied. Here, $G_m$ is the optimal compensation coefficient, and r indicates $|N|/|Q|$ or $|Q|/|N|$. Further, FIGS. 15A to 15D show an example of a calculation result of the optimal compensation coefficient with respect to the amplitude ratio $a_3/a_1$ when the linearity correction function "$\alpha N/(|N|+|Q|)+(1-\alpha)N|N|/(N^2+Q^2)$" is applied. Here, $\alpha$ is the optimal compensation coefficient, and N and Q are readback signal amplitude values corresponding to the null burst patterns N and Q, respectively. Furthermore, FIGS. 16A to 16D show an example of a calculation result of the optimal compensation coefficient with respect to the amplitude ratio $a_3/a_1$ when the linearity correction function "$p = g_1 \times r + g_2 \times r^2 + g_3 \times r^3$, $g_1 + g_2 + g_3 = 1$" is applied.

Here, $r=|Q|/|N|$ if $|N|>|Q|$, and $r=|N|/|Q|$ if $|N|<|Q|$. This linearity correction function can be regarded as the one having the restriction "$a_0=0$, $a_1+a_2+a_3=1$" in formula (7) described in U.S. Pat. No. 7,312,946, for example. By the constraint condition, the number of independent parameters is 2.

Next, with reference to the flowchart of FIG. 17, the steps of update processing for the optimal compensation coefficient and the rotation compensation angle by the MPU 14 will be described. Further, each of FIGS. 18A to 18K, FIGS. 19A to 19K, and FIGS. 20A to 20K is the figure for explaining a specific example of a process for updating the optimal compensation coefficient and the rotation compensation angle in real time by the above-mentioned steps.

First of all, the MPU 14 sets an initial value regarding S2MAX and S2MIN, which are the square roots of the maximum value and the minimum value within the number of samples n calculated from the sum of squares ($S2^2$) described above (block 300). Further, the MPU 14 acquires demodulated N and Q which are read from the servo area (servo wedge) (block 301). N and Q are readback signal amplitude values (refer to equations (1) to (4) described above).

Next, the MPU 14 executes the processing of acquiring the maximum value S2MAX and the minimum value S2MIN of the number of samples n (block 302). The MPU 14 repeats the processing shown in block 302 m times, and calculates the average value (S2MAX_AVE, S2MIN_AVE) and the standard deviation (S2MAX_STD, S2MIN_STD) (block 303). S2X and S2N are constants for securing the effective digit of variables to be used in obtaining the standard deviation. Specifically, S2X and S2N are around expected values of $a_1+a_3$ and $a_1-a_3$, respectively, and are set values, such as S2X=S2N=$a_1$ or S2X=$1.06 \times a_1$ and S2N=$0.94 \times a_1$.

The MPU 14 carries out the operation as shown in the following equations (34) and (35) based on the average value and the standard deviation calculated by the processing of block 303 (block 304):

$$A31AVE = (S2MAX\_AVE - S2MIN\_AVE) / (S2MAX\_AVE + S2MIN\_AVE) \quad (34)$$

$$A31STD = (S2MAX\_STD + S2MIN\_STD) / (S2MAX\_AVE + S2MIN\_AVE) \quad (35)$$

Since S2MAX_STD and S2MIN_STD have substantially the same value, equation 35 may be rewritten as shown in the following equation (36) or (37):

$$A31STD=2\times S2MAX\_STD/(S2MAX\_AVE+S2MIN\_AVE) \quad (36)$$

$$A31STD=2\times S2MIN\_STD/(S2MAX\_AVE+S2MIN\_AVE) \quad (37)$$

As described above, the MPU 14 calculates compensation coefficients a, b with respect to the amplitude ratio $a_3/a_1$ in the correction linear function based on a result of the operation (A31AVE) (refer to FIGS. 9A and 9B). Further, the MPU 14 executes the operation expression "$a_3/a_1$=A31AVE−(a× A31STD+b)" by using the calculated compensation coefficients a, b, and calculates the amplitude ratio $a_3/a_1$ (block 305). Estimated errors of the amplitude ratio $a_3/a_1$ are plotted by open circles as shown in FIGS. 6E and 7E. These errors are sufficiently small as compared to the estimated errors plotted by open circles as shown in FIGS. 6D and 7D.

By the above procedure, the MPU 14 can calculate the amplitude ratio $a_3/a_1$ corresponding to the maximum value and the minimum value of the sum of squares (namely, S2MAX and S2MIN). Therefore, the MPU 14 can update the optimal compensation coefficients based on the calculated amplitude ratio $a_3/a_1$ as described above (block 306). Further, in acquiring the maximum and minimum values S2MAX and S2MIN of samples n, the MPU 14 acquires S4 by assuming that S4=(Q−N)/(N+Q) in the condition that |N+Q|>|N−Q|, or S4=|N+Q|>|N−Q| in any other conditions, as described above. The MPU 14 then averages S4 of the aforementioned conditions m times, and can update the rotation compensation angle θ from the relation with the averaged S4, which is θ=arctan(S4) (block 307).

Here, specific examples shown in FIGS. 18A to 18K relate to the case of the combination of the magnetization pattern on the disk 1 and the read head 10R. The magnetization pattern has the characteristics that an average value of the amplitude ratio $a_3/a_1$ is 0.10, an average rotation angle is 20 degrees, and a pitch non-uniformity is 5% rms. In this case, the conditions are set to be n=10, m=20, noise added to the NQ signal is 0.01 rms, displacement disturbance=0.05, and virtual circle amplitude=5.0 (the unit is magnetization pattern period). These specific examples show that the position error signal (PES), which has been demodulated when the amplitude ratio ($a_3/a_1$) is 0.0, which is the initial estimated value, and the rotation angle is set to be zero as the initial setting, and the demodulation error are calculated, based on the above conditions. From FIGS. 18A to 18K, it is possible to confirm that the optimal compensation coefficient and the rotation compensation angle can be updated by the estimated amplitude ratio $a_3/a_1$ and the estimated rotation angle obtained after the total sample (n×m) reaches 200, and the subsequent demodulation errors can be made sufficiently small.

The specific examples shown in FIGS. 19A to 19K are the examples of the case where the virtual circle amplitude is as small as 1.0. In this case, since the travel distance is small with n sample, detection of S2MAX and S2MIN is insufficient. Thus, the estimated amplitude ratio $a_3/a_1$ is deviated a little, and there is a section in which the demodulation error is somewhat large.

On the other hand, the specific examples shown in FIGS. 20A to 20K are the same those of FIGS. 19A to 19K in that the virtual circle amplitude is 1.0, but the displacement disturbance is as large as 0.25. Therefore, a detection frequency of S2MAX and S2MIN is high and the demodulation error is relatively small.

If relative position fluctuations of the head with respect to the magnetization pattern are small, servo positioning accuracy is in a good state as a matter of course. Therefore, it is not mandatory to update the optimal compensation coefficient and the rotation compensation angle, and the processing may be stopped. Further, in managing the disk 1 by dividing the tracks into each zone, preferably, the optimal compensation coefficient and the rotation compensation angle should be stored for each zone, and the update processing should be performed for each zone. In this case, determination and averaging of S2MAX and S2MIN do not necessarily have to be performed in continuous sampling. That is, alternatively, it is possible to perform the sampling when returning to the zone after moving to a different zone and continue the update processing. Further, in executing the update processing, if previously obtained optimal compensation coefficient and rotation compensation angle are utilized by adding a weight to each of those values in addition to newly obtained optimal compensation coefficient and rotation compensation angle, the accuracy can be enhanced as time passes.

Further, while the present embodiment assumes that the so-called "Lissajous offset" is removed, it is also possible to perform offset compensation in real time by constantly monitoring the N and Q signals and updating their average values. For example, when an exponential moving average (EMA) is used, by using the operation expressions "N_offset=(N+(k−1)×N_offset)/k" and "Q_offset=(Q+(k−1)×Q_offset)/k" with smoothing coefficient 1/k, N_offset and Q_offset may be updated to correct the offsets of N and Q. In this case, k should be set to a number which is greater than the number of samples of several tracks.

As described above, according to the present embodiment, while a disk drive is being operated after its shipment, even if no special calibration processing is executed, a correct position error signal can be demodulated by performing calibration at any time. Accordingly, the method and the apparatus as claimed enable reducing adjustment in a manufacturing process of a disk drive and preventon of lowering the performance of the disk drive in operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of servo demodulation in a disk storage apparatus comprising a reader and a disk where servo patterns are recorded, each of the servo patterns comprising a first area and a second area, wherein phases of a magnetization pattern of the first area and a magnetization pattern of the second area are mutually different in a cross track direction, and each of the first area and the second area includes burst signal patterns, the method comprising:

generating a plurality of first and second demodulated signals calculated from amplitude values of the plurality of burst signal patterns of the first and second areas, in order to generate a position error signal of the reader, based on the servo pattern read from the disk by the reader;

calculating a plurality of square-roots each corresponding to a square-root of a sum of squares of the first and second demodulated signals; and calculating an optimal compensation coefficient of a linearity correction function to be used in linearity compensation of the position error signal based on a maximum value and a minimum value of the plurality of square-roots.

2. The method of claim 1, further comprising:
calculating the maximum value and the minimum value of a predetermined number of the square-roots.

3. The method of claim 2, further comprising:
repeating processing of calculating the maximum value and the minimum value of the predetermined number of the square-roots for a predetermined number of times;
calculating an average value and a standard deviation of each of the calculated maximum value and minimum value; and
calculating the optimal compensation coefficient based on the average value and the standard deviation.

4. The method of claim 2, further comprising:
repeating processing of calculating the maximum value and the minimum value of the predetermined number of the square-roots for a predetermined number of times to obtain the maximum values and the minimum values;
calculating an average of each of the maximum values and the minimum values;
calculating a difference between the average of the maximum values and the average of the minimum values;
calculating a sum of the average of the maximum values and the average of the minimum values;
calculating a first ratio between the difference and the sum;
calculating a second ratio between a standard deviation of the maximum values and the sum; and
calculating an optimal compensation coefficient of the linearity compensation function based on a value obtained by compensating the first ratio with a value obtained by substituting the second ratio into a linear expression determined by the first ratio and the number of the square-roots.

5. The method of claim 1, further comprising:
performing rotation angle compensation for compensating a rotation angle prior to the linearity compensation;
acquiring the first and second demodulated signals in acquiring the maximum value and the minimum value of the square-roots of the sum of squares; and
calculating an optimal rotation compensation angle to be used in the rotation angle compensation based on the first and second demodulated signals.

6. The method of claim 5, further comprising:
calculating a ratio between a sum of the first and the second demodulated signals and a difference between the first and second demodulated signals; and
calculating the optimal rotation compensation angle based on the ratio.

7. A data storage apparatus comprising:
a disk configured to record servo patterns each comprising a first area and a second area, wherein phases of a magnetization pattern of the first area and a magnetization pattern of the second area are mutually different in a cross track direction, and each of the first area and the second area includes burst signal patterns;
a reader; and
a controller configured to perform servo demodulation processing based on the servo pattern read from the disk by the reader,
wherein the controller is configured to:
generate a plurality of first and second demodulated signals calculated from amplitude values of the burst signal patterns of the first and second areas, in order to generate a position error signal of the reader, based on the servo pattern read from the disk by the reader;
calculate a plurality of square-roots each corresponding to a square-root of a sum of squares of the first and second demodulated signals; and
calculate an optimal compensation coefficient of a linearity correction function to be used in linearity compensation of the position error signal based on a maximum value and a minimum value of the plurality of square-roots.

8. The data storage apparatus of claim 7,
wherein the controller is configured to calculate the maximum value and the minimum value of a predetermined number of the square-roots.

9. The data storage apparatus of claim 8,
wherein the controller is configured to:
repeat processing of calculating the maximum value and the minimum value of the predetermined number of the square-roots for a predetermined number of times;
calculate an average value and a standard deviation of each of the calculated maximum value and minimum value; and
calculate the optimal compensation coefficient based on the average value and the standard deviation.

10. The data storage apparatus of claim 8,
wherein the controller is configured to:
repeat processing of calculating the maximum value and the minimum value of the predetermined number of the square-roots for a predetermined number of times to obtain the maximum values and the minimum values;
calculate an average of each of the maximum values and the minimum values;
calculate a difference between the average of the maximum values and the average of the minimum values;
calculate a sum of the average of the maximum values and the average of the minimum values;
calculate a first ratio between the difference and the sum;
calculate a second ratio between a standard deviation of the maximum values and the sum; and
calculate an optimal compensation coefficient of the linearity compensation function based on a value obtained by compensating the first ratio with a value obtained by substituting the second ratio into a linear expression determined by the first ratio and the number of the square-roots.

11. The data storage apparatus of claim 7,
wherein the controller is configured to:
perform rotation angle compensation for compensating a rotation angle prior to the linearity compensation;
acquire the first and second demodulated signals in acquiring the maximum value and the minimum value of the square-roots of the sum of squares; and
calculate an optimal rotation compensation angle to be used in the rotation angle compensation based on the first and second demodulated signals.

12. The data storage apparatus of claim 11,
wherein the controller is configured to:
calculate a ratio between a sum of the first and second demodulated signals and a difference between the first and second demodulated signals; and
calculate the optimal rotation compensation angle based on the ratio.

13. A data storage apparatus comprising:
a disk configured to record servo patterns each comprising a first area and a second area, wherein phases of a magnetization pattern of the first area and a magnetization pattern of the second area are mutually different in a cross track direction, and each of the first area and the second area includes a plurality of burst signal patterns;

a reader configured to pass over the servo pattern to read the servo pattern; and a controller configured to perform servo demodulation processing based on the servo pattern read from the disk by the reader, wherein the controller is configured to:

generate first and second demodulated signals calculated from amplitude values of the burst signal patterns of the first and second areas, in order to generate a position error signal of the reader, based on the servo pattern read from the disk, whenever the head passes over each of the servo patterns;

calculate square-roots of a sum of squares of the first and second demodulated signals, the square-roots of the sum being continuously varied depending on a time; and calculate an optimal compensation coefficient of a linearity correction function to be used in linearity compensation of the position error signal based on a maximum value and a minimum value of the square-roots.

14. The data storage apparatus of claim 13, wherein the controller is configured to calculate the maximum value and the minimum value of a predetermined number of value data selected from the square-roots.

15. The data storage apparatus of claim 14, wherein the controller is configured to:

repeat processing of calculating the maximum value and the minimum value of the predetermined number of value data, for a predetermined number of times;

calculate an average value and a standard deviation of each of the calculated maximum value and minimum value; and calculate the optimal compensation coefficient based on the average value and the standard deviation.

16. The data storage apparatus of claim 14, wherein the controller is configured to:

repeat processing of calculating the maximum value and the minimum value of the predetermined number of value data, for a predetermined number of times, to obtain the maximum values and the minimum values;

calculate an average of each of the maximum values and the minimum values;

calculate a difference between the average of the maximum values and the average of the minimum values;

calculate a sum of the average of the maximum values and the average of the minimum values;

calculate a first ratio between the difference and the sum;

calculate a second ratio between a standard deviation of the maximum values and the sum; and calculate an optimal compensation coefficient of the linearity compensation function based on a value obtained by compensating the first ratio with a value obtained by substituting the second ratio into a linear expression determined by the first ratio and the number of the square-roots.

17. The data storage apparatus of claim 13, wherein the controller is configured to:

perform rotation angle compensation for compensating a rotation angle prior to the linearity compensation;

acquire the first and second demodulated signals in acquiring the maximum value and the minimum value of the square-roots of sum of squares; and calculate an optimal rotation compensation angle to be used in the rotation angle compensation based on the first and second demodulated signals.

18. The data storage apparatus of claim 13, wherein the controller is configured to:

calculate a ratio between a sum of the first and second demodulated signals and a difference between the first and second demodulated signals; and calculate the optimal rotation compensation angle based on the ratio.

* * * * *